US009442466B2

(12) United States Patent
Gilbertson et al.

(10) Patent No.: US 9,442,466 B2
(45) Date of Patent: Sep. 13, 2016

(54) SYSTEM, METHOD AND APPARATUS FOR CREATING AND MAINTAINING BIOMETRIC SECURE SAFE DEPOSIT BOXES, AND SIMILAR CONTAINERS AND FACILITIES

(71) Applicants: Matthew R. Gilbertson, Downingtown, PA (US); Timothy A. Freese, Coatesville, PA (US)

(72) Inventors: Matthew R. Gilbertson, Downingtown, PA (US); Timothy A. Freese, Coatesville, PA (US)

(73) Assignee: 3-EAST, LLC, Coatesville, PA (US)

( * ) Notice: Subject to any disclaimer, the term of this patent is extended or adjusted under 35 U.S.C. 154(b) by 710 days.

(21) Appl. No.: 13/668,912

(22) Filed: Nov. 5, 2012

(65) Prior Publication Data

US 2013/0113602 A1 May 9, 2013

Related U.S. Application Data

(60) Provisional application No. 61/555,042, filed on Nov. 3, 2011.

(51) Int. Cl.
*G05B 1/01* (2006.01)
*G07C 9/00* (2006.01)

(52) U.S. Cl.
CPC ............. *G05B 1/01* (2013.01); *G07C 9/00071* (2013.01); *G07C 9/00912* (2013.01)

(58) Field of Classification Search
CPC .......... G07C 9/00309; G07C 9/00563; G07C 9/00182; G07C 2009/00317; G07C 2009/00325; G07C 2009/00341; G07C 2009/00603; G07C 9/00031; G07C 9/00857; G07C 2009/00238; G07C 2009/00261; G07C 9/00912; G07C 2009/0092; G07C 2009/00936; G07C 9/00896; G07C 9/00571
USPC ........... 340/5.2, 5.21, 5.22, 5.23, 5.24, 5.25, 340/10.51, 10.52, 426.35, 426.36
See application file for complete search history.

(56) References Cited

U.S. PATENT DOCUMENTS 4,519,228 A * 5/1985 Sornes .................. E05B 49/006 235/382.5
4,811,012 A * 3/1989 Rollins .............. G07C 9/00103 235/382.5
4,972,182 A * 11/1990 Novik ................ G07C 9/00182 340/5.25
5,083,122 A * 1/1992 Clark .................. E05B 47/0012 340/5.22
5,475,376 A * 12/1995 Chikamitue .............. E05G 1/08 340/5.73
6,177,879 B1 * 1/2001 Kokubu .............. B60L 11/1801 340/432
6,380,842 B1 * 4/2002 Mattes ..................... B60R 25/04 307/10.2
6,895,241 B2 * 5/2005 Hara .................. G07C 9/00103 340/5.5
6,975,202 B1 * 12/2005 Rodriguez ......... G07C 9/00103 340/10.1
6,980,672 B2 * 12/2005 Saito .................. G06K 9/00006 340/5.53
7,170,998 B2 * 1/2007 McLintock ........ G07C 9/00103 340/5.23
7,176,782 B2 * 2/2007 Shitan ................ G07C 9/00309 340/5.2

(Continued)

*Primary Examiner* — An T Nguyen

(74) *Attorney, Agent, or Firm* — Frank J. Bonini, Jr.; John F. A. Earley, III; Harding, Earley, Follmer & Frailey, P.C.

(57) ABSTRACT

A method for commissioning a collection of electronic locks by inserting the same electronic key into each of the locks and recording in the electronic key an internal code unique to that lock which identifies the lock and is needed to open the lock and a method for biometrically permitting controlled secure access to a container having one of the commissioned electronic locks.

5 Claims, 38 Drawing Sheets

10A

(56) References Cited

U.S. PATENT DOCUMENTS 8,479,982 B1 * 7/2013 Gromley ................. G07F 19/00 235/379
8,581,690 B2 * 11/2013 Lappalainen ....... E05B 47/0611 340/3.1
2003/0025589 A1 * 2/2003 Koike .................. G06Q 20/341 340/5.25
2003/0025590 A1 * 2/2003 Gokcebay .............. G06Q 40/04 340/5.73
2004/0021552 A1 * 2/2004 Koo ................... G07C 9/00087 340/5.53
2005/0040931 A1 * 2/2005 Shitan ................ G07C 9/00309 340/5.5
2006/0170533 A1 * 8/2006 Chioiu ............... G07C 9/00103 340/5.61
2006/0181392 A1 * 8/2006 Watson ................... E05B 35/12 340/5.73
2006/0217835 A1 * 9/2006 Stobbe ...................... E05G 1/08 700/214
2007/0096870 A1 * 5/2007 Fisher ................. E05B 19/0005 340/5.53
2007/0256615 A1 * 11/2007 Delgrosso ................. E05G 1/08 109/38
2009/0051489 A1 * 2/2009 Kim ................... G07C 9/00563 340/5.82
2010/0109837 A1 * 5/2010 Sato ...................... E05B 35/086 340/5.65
2010/0225441 A1 * 9/2010 Fisher ................. E05B 19/0005 340/5.73
2011/0084799 A1 * 4/2011 Ficko ................ G07C 9/00904 340/5.65
2011/0174029 A1 * 7/2011 Lappalainen ....... E05B 47/0611 70/279.1
2012/0213362 A1 * 8/2012 Bliding .............. G07C 9/00309 380/44
2013/0113602 A1 * 5/2013 Gilbertson ............... G05B 1/01 340/5.52
2013/0127593 A1 * 5/2013 Kuenzi .............. G07C 9/00103 340/5.61

* cited by examiner

SCREEN SHOT A

Customer Details

- First Name: John
- Last Name: Doe
- Address: 101 Cheshire Ct
- Address 2:
- City, State, Zip: Coatesville, PA 19320
- Phone #: (610)466-9600
- E-Mail Address: john.doe@3-east.com
- ID #: 1234
- Pin Number:
- MI: A
- Suffix:
- Office
- ☐ Use PIN

[Cancel] [Back] [Next] [Finish]

SCREEN SHOT B

SCREEN SHOT C

SCREEN SHOT D

SCREEN SHOT E

SCREEN SHOT F

SCREEN SHOT G

SCREEN SHOT H

| Field | Value |
|---|---|
| Select Container | Box 275 |
| Container Owner(s) | Doe, John |
| Date Opened | 9/11/2012 21:45:10 |
| Current Expiration Date | 3/11/2013 |
| Renewal Terms | 12 Months |
| New Expiration Date | 3/11/2014 |

SCREEN SHOT I

SCREEN SHOT J

SCREEN SHOT K

SCREEN SHOT L

SCREEN SHOT M

SCREEN SHOT N

SCREEN SHOT O

SCREEN SHOT P

SCREEN SHOT Q

SCREEN SHOT R

SCREEN SHOT S

SCREEN SHOT T

FIG.30
Employee Permissions
Permissions
Administrator
Kiosk Access
Add Customers
Edit Customers
Temp Worker
Expires On
9/12/2012
Key Duration (Minutes)
60
Cancel
< Back
Next >
Finish

SCREEN SHOT U

SCREEN SHOT V

SCREEN SHOT W

FIG.33
Configuration
Time Sync
Kiosk
Log Files
Existing Time Sync Servers
Host Name / IP Address
Port
Comment
Inactive
nist1-pa.ustiming.org
123
Hatfield, PA
nist1-nj.ustiming.org
123
Bridgewater, NJ
64.147.116.229
123
Los Angeles, CA
64.250.229.100
123
Las Vegas, NV
Time Sync Server Details
Host Name or IP
Port
123
Comment
Inactive
Delete
Save

SCREEN SHOT X

SCREEN SHOT Y

SCREEN SHOT Z

SCREEN SHOT AA

SCREEN SHOT AB

SCREEN SHOT AC

SCREEN SHOT AD

SCREEN SHOT AE

SYSTEM, METHOD AND APPARATUS FOR CREATING AND MAINTAINING BIOMETRIC SECURE SAFE DEPOSIT BOXES, AND SIMILAR CONTAINERS AND FACILITIES

CROSS REFERENCE TO RELATED PATENT APPLICATION

This patent application claims the benefit under 35 U.S.C. 119 and 35 U.S.C. 120 of U.S. provisional application Ser. No. 61/555,042 entitled "Method for Securing and Accessing a Safe," filed 3 Nov. 2011. The disclosure of the '042 application is hereby incorporated by reference in its entirety.

BACKGROUND OF THE INVENTION

1. Field of the Invention

This invention relates to methods and apparatus for creating and maintaining biometric secure containers such as safe deposit boxes by requiring a person seeking access to the secure container or facility to have a biometric match with biometric data previously provided by that person stored in a database, before the person can be permitted access to the secure container or facility.

2. Description of the Prior Art

Safe deposit boxes and teller lock boxes have been used in banks and other financial institutions for many years. The typical safe deposit box requires two mechanical keys for the box to be opened. When a customer goes to the bank and seeks access to the customer's safe deposit box, the customer must sign a card indicating that the customer is requesting access to the safe deposit box and the customer must have the customer's key for that particular customer's safe deposit box. A bank employee then obtains the bank's key for the safe deposit box, whereupon the customer and the bank employee enter a secure area, typically within the bank vault, where the safe deposit boxes are located. The customer then inserts the customer's key into one of the lock portions of the safe deposit box and the bank employee inserts the bank's key into a second lock portion of the safe deposit box. When both keys are turned, the two lock portions move the lock to the open position, whereupon the safe deposit box can be removed and the customer may access the box to conduct the customer's business. When the customer is finished with his or her business, the customer must summon the bank employee with the bank's key whereupon the safe deposit box is inserted back into its slot in which the box resides, the door to the safe deposit box is closed, the customer inserts the customer's key into one of the lock portions of the safe deposit box door and the bank employee inserts the bank's key into the other lock portion of the safe deposit box door, the customer and the bank employee then turn their keys thereby locking the safe deposit box door against intrusion by unauthorized personnel.

Similarly to the operation of the traditional safe deposit box, nearly every bank teller has a teller drawer in which cash and perhaps checks, that are processed by that particular teller during the teller's shift of work, are kept. Typically such a teller drawer has a two lock part similarly to a safe deposit box. Currency is typically deposited into the teller's drawer through a slot that is much too small for a human hand to pass through. When it is desired to open the teller's drawer, the teller summons a colleague employed by the bank. The teller and the bank colleague each have a key, with the bank colleague having the bank's so-called master key. The teller and the bank employee insert the respective keys into two separate lock portions that maintain the teller drawer secure. The teller and the bank employee then duplicate the procedure followed by the bank employee and the bank customer as described above, opening the lock using the two keys thereby providing access to the teller drawer so that the currency may be removed, other valuables may be stored in the teller drawer, etc.

These procedures are cumbersome, time-consuming and require a bank employee to participate in each operation.

SUMMARY OF THE INVENTION

In one of it's aspects this invention provides a method for commissioning a collection of electronic locks where the method includes the steps of inserting the same electronic key into each of the locks and recording in the electronic key an internal code unique to that lock which identifies the lock and is needed to open the lock. The method proceeds by transferring the internal codes for each of the locks from the electronic key into a data processing machine. The data processing machine maintains the internal codes together with identifying codes for each lock of the collection.

Upon request by a potential customer, the data processing machine identifies the internal code for a selected one of the locks, the customer has been previously identified as being authorized to access materials secured by the selected lock. The data processing machine encodes the internal code for the selected lock into an electronic key that is then useable by the identified authorized customer.

In another one of its aspects this invention provides a method for biometrically electronically permitting only simultaneous controlled access to a container secured by an electronic lock where the method commences with the step of electronically biometrically identifying a first customer to be given access on a simultaneous dual access basis to a container secured by the lock. The method proceeds with electronically biometrically identifying a second potential customer to be given access on a simultaneous dual access basis to the container secured by the lock. The method further yet proceeds with the insertion of an activated electronic key into the lock and recording an internal code which is needed to open the lock and which identifies the lock. The internal code for that lock is then transferred into a data-processing machine which maintains the internal code for the lock of interest in the data-processing machine. The method then proceeds by electronically biometrically identifying the first and second potential customers to be given simultaneous access on a dual access basis to the container secured by the lock. The method then proceeds by electronically concurrently comparing the biometrically identified first potential customer and the second biometrically identified potential customer to a previously generated list of biometrically identified customers authorized to have simultaneous access to the secured containers to determine whether the first and second biometrically identified potential customers are authorized to have such simultaneous access. The method then proceeds by providing the internal code in the form of a removable electronic key to the first and second potential customers identified concurrently as being authorized to simultaneously access the container secured by the lock; this is done by encoding the internal code into an electronic key usable by the identified authorized by simultaneous customers.

In the preferred practice of this aspect of the invention the recording of the internal code is performed within the electronic key. A step of electronically biometrically identifying potential customers is preferably performed by electronically sensing fingerprints of the potential customers. Alternatively, the step of electronically biometrically identifying potential customers may be performed by electronically sensing a print of any fingers or thumbs of the potential customers or the palms of the potential customers. In yet another aspect of the invention, the step of electronically biometrically identifying potential customers may be performed by electronically sensing eye characteristics of the potential customers. In yet another aspect of the invention, the step of electronically biometrically identifying potential customers may be performed by sensing the DNA of the potential customers.

In still another aspect of the invention, there is provided a method for biometrically electronically controlling access to a container secured by an electronic lock. In this aspect of the invention the method commences by inserting an electronic key into the lock and recording an internal code needed to open the lock where the code is recorded within the electronic key. The internal code for that lock is then transferred from the electronic key into a data processing machine. The internal code is maintained together with an identifying code for the lock of interest in the data processing machine. The method then proceeds by electronically biometrically identifying any person seeking to access materials secured by the lock. The method further proceeds by electronically comparing the biometrically identified person to a previously generated list of biometrically identified persons authorized to have access to the secured container to determine whether the identified persons are authorized to have access. If the identified person is found to be authorized to have access, the invention proceeds by providing the internal code to a person identified as authorized to access the container secured by the lock by encoding the internal code into an electronic key useable by the identified authorized person thereby to access the materials secured by the lock.

One of the important aspects of the invention is the incorporation of a personal computer interface, for both touch screen and non-touch screen units, with all necessary hardware and software to provide a deployable and standalone, yet enterprise scale all-in-one biometric locking station for programmable electromechanical cores and keys in accordance with the invention.

A further important aspect of the invention are the key retention units which are important because the software of the invention is able to control when the keys are programmed and released, namely made available for the user to remove. This is important because without the key retention units, the keys could become locked up or non-programmable if they are removed or replaced when the software is not expecting them to be removed or replaced. For example, if the software is downloading a schedule into the key and the key is removed before the download is completed, the programming would fail and make the key unusable. Accordingly, the keys in accordance with the invention are locked in place and only released when the software permits them to be released.

BRIEF DESCRIPTION OF THE DRAWINGS

In FIG. 1, individual containers are numbered 1 through 8 and "A" and "B" respectively for purposes of identification herein.

DESCRIPTION OF THE PREFERRED EMBODIMENTS AND THE BEST MODE FOR PRACTICE OF THE INVENTION

In a preferred embodiment of the invention, there is provided apparatus and methods to provide a comprehensive locking solution intended principally for financial institutions and other industries that are subject to regulatory security requirements. In the preferred embodiments, the apparatus of the invention includes management software, a Microsoft SQL RDBMS, preferable touch screen with end user interfaces, at least one certified biometric reader, and high security programmable keys insertable into corresponding lock cores. In one preferred embodiment of the invention, the high security programmable keys and lock cores are Medico NexGen XT cylinders, cores and keys.

Figure 1:
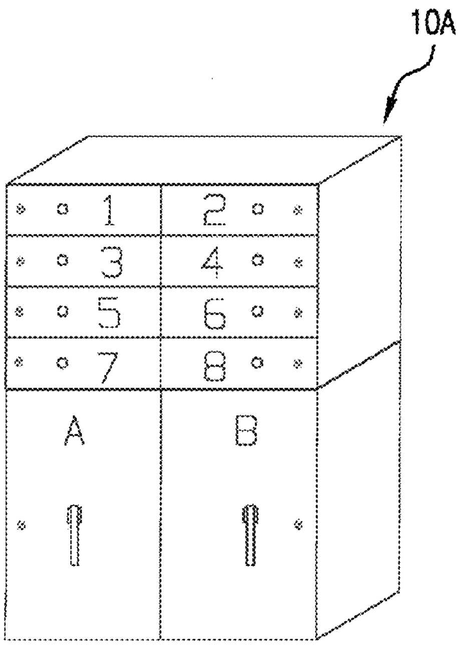
FIG. 1 is a schematic depiction of a collection of containers to which individual customers would desire access after renting the container, with the containers being under the jurisdiction of a supplier and access to the containers being controlled by the method and apparatus of the invention.
Figure 2:
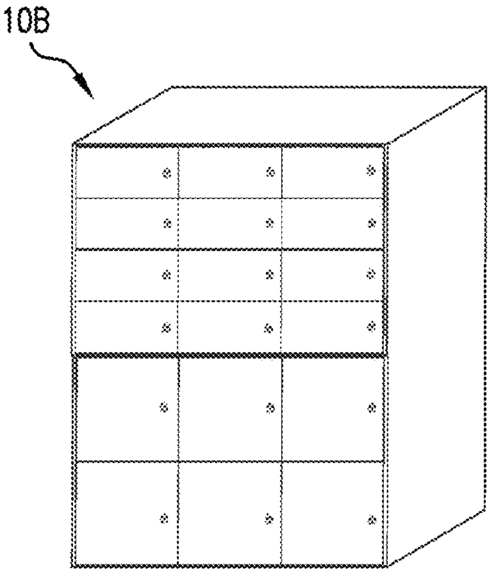
FIG. 2 is another schematic depiction of a collection of containers, access to which can be controlled in accordance with the invention.
Figure 3:
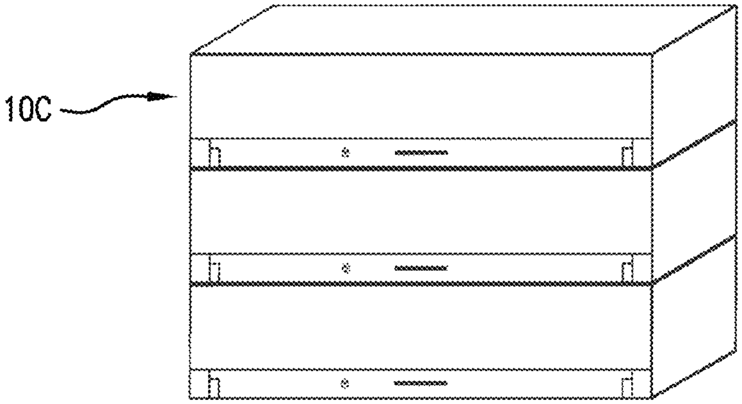
FIG. 3 is a schematic depiction of yet another configuration of containers to which access can be controlled according to this invention.

As used herein, "container", such as container 26, generally refers to a safe deposit box, such as those shown that are housed in collective form in container housings 10A, 10B and 10C in FIGS. 1, 2 and 3. As used herein, "customer" generally refers to an individual or entity renting one of the containers 26. In some instances herein, the word "kiosk" is used in place of the word "terminal." As used herein "terminal", such as terminal 20, generally refers to a kiosk or more preferably a standalone terminal to which a customer goes to obtain access to the customer's rented container 26. In some instances herein the word "kiosk" is used in place of the word "terminal"; no inferences are to be drawn from such usage. As used herein, "supplier" generally denotes the entity, such as a bank, owning the containers 26 and terminals 20, and which rents the containers 26 to customers. As used herein "software" generally refers to the computer programs that process data from a biometric reader or input device, such as a biometric fingerprint reader 34, and from one or more programmable electronic keys, such as electronically programmable keys 18, which operates to achieve the security function of the invention.

Figure 7:
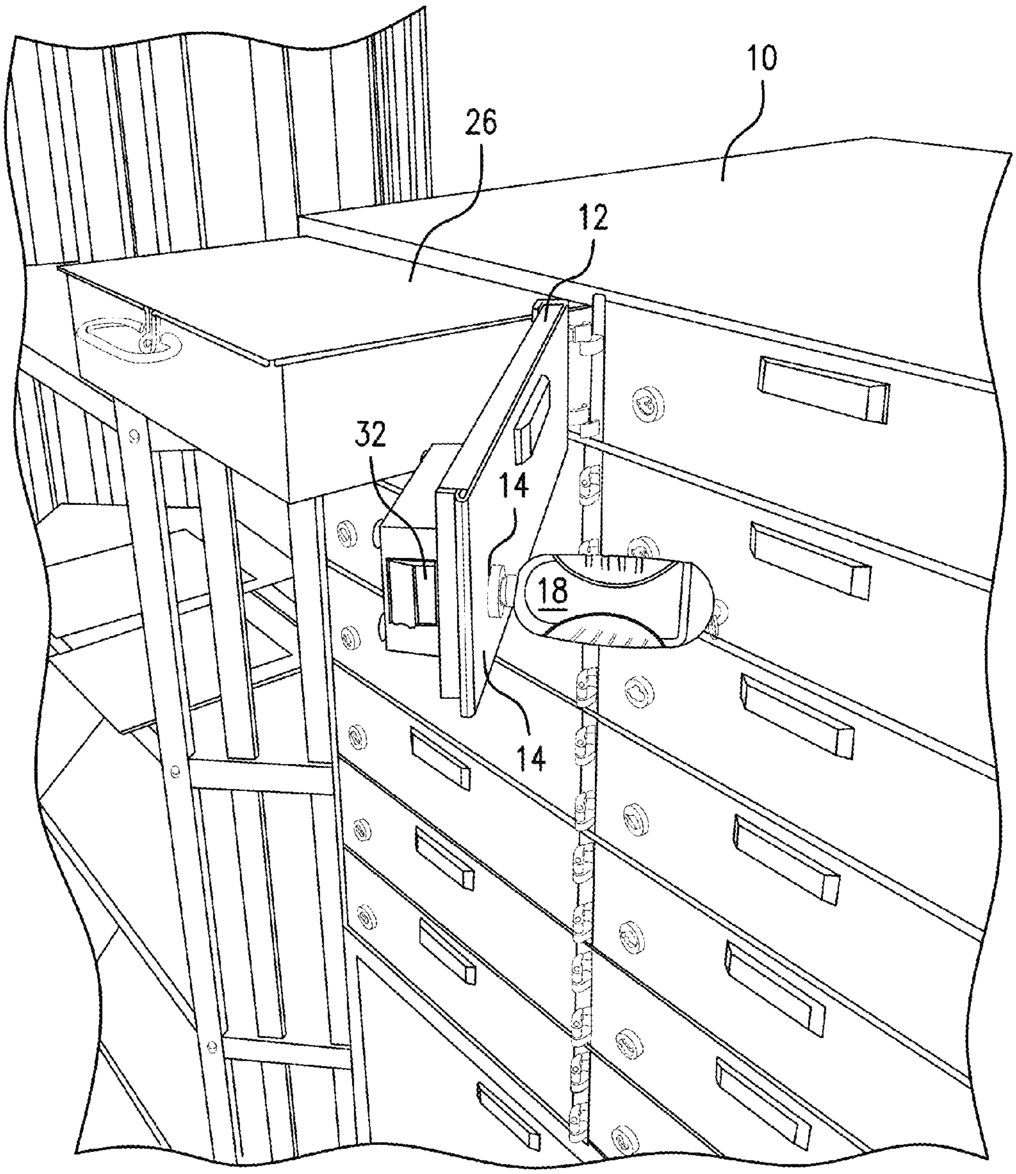
FIG. 7 is a view of an electronic key as shown in FIG. 5 in place after a secured container has been opened using the method of the invention.

Referring to the drawings in general, and to FIGS. 1, 2 and 3 in particular, container housings 10, for housing containers in a secure manner in accordance with the invention, take various configurations, with container housings 10A, 10B and 10C being illustrated in FIGS. 1, 2 and 3, as exemplary configurations of container housings. Each container housing 10 includes a plurality of container housing doors 12, with each container housing door 12 providing access to a container 26 retained within the container housing by closure of container door 12. Container housing 10A, with one door 12 open as illustrated in FIG. 7 with a container 26 being partially removed from the container housing 10A.

Figure 5:
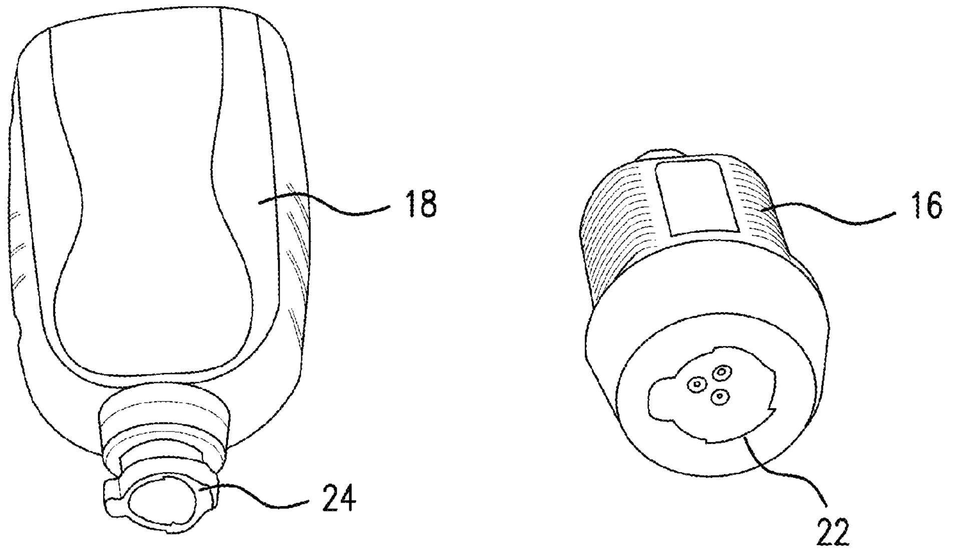
FIG. 5 is an isometric view of an electronic key and corresponding electronic cylinder used in the course of practice of the invention.
Figure 8:
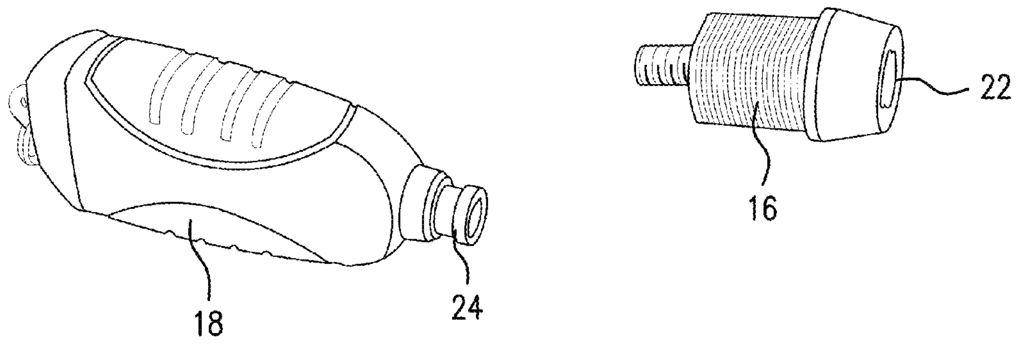
FIG. 8 is an isometric view, taken from a different perspective, of the electronic key and corresponding electronic cylinder illustrated in FIG. 5.
Figure 9:
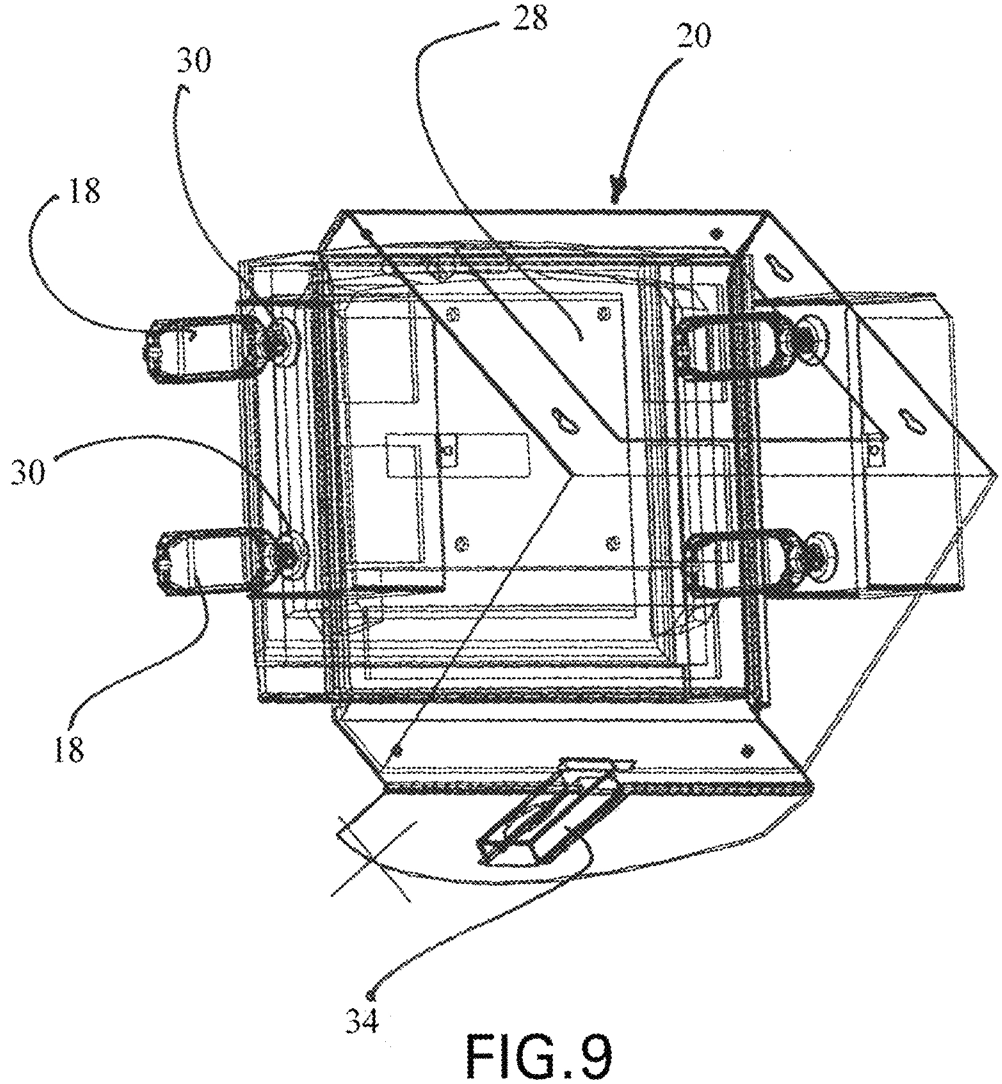
FIG. 9 is a schematic isometric view of a terminal similar to that illustrated in FIG. 4, but with four electronic keys in place and with a fingerprint reader portion of the terminal clearly shown.

An electronically programmable lock 14 is illustrated generally in FIG. 5 and in FIG. 8, together with an electronically programmable key 18 in those two Figures. Each electronically programmable lock includes a cylinder portion as illustrated in FIGS. 5 and 8, where the cylinder portion is numbered generally 16, and includes a receptacle formed in one end of the cylinder portion where the receptacle is numbered 22 and serves as a female portion of the electronically programmable lock 14. Receptacle 22 receives a plug portion 24 of an electronically programmable key 18, where plug portion 24 serves as the male portion to mate with female portion 22 when an electronically programmable key 18 is used to open an electronically programmable lock 14.

Figure 4:
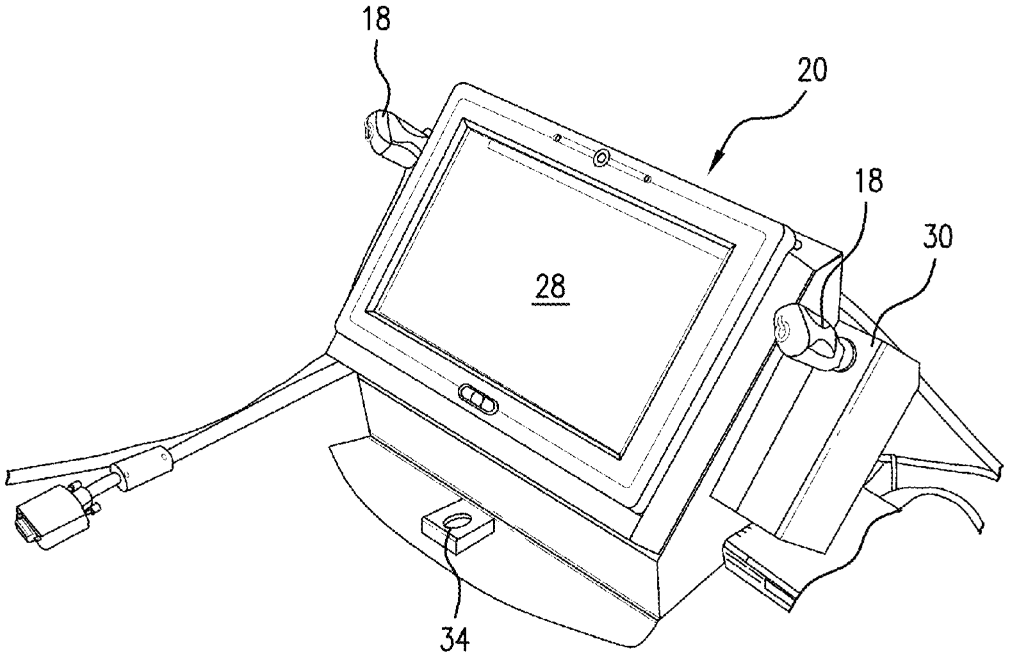
FIG. 4 is an isometric view of a terminal manifesting aspects of the invention and used in the course of practice of the invention.
Figure 6:
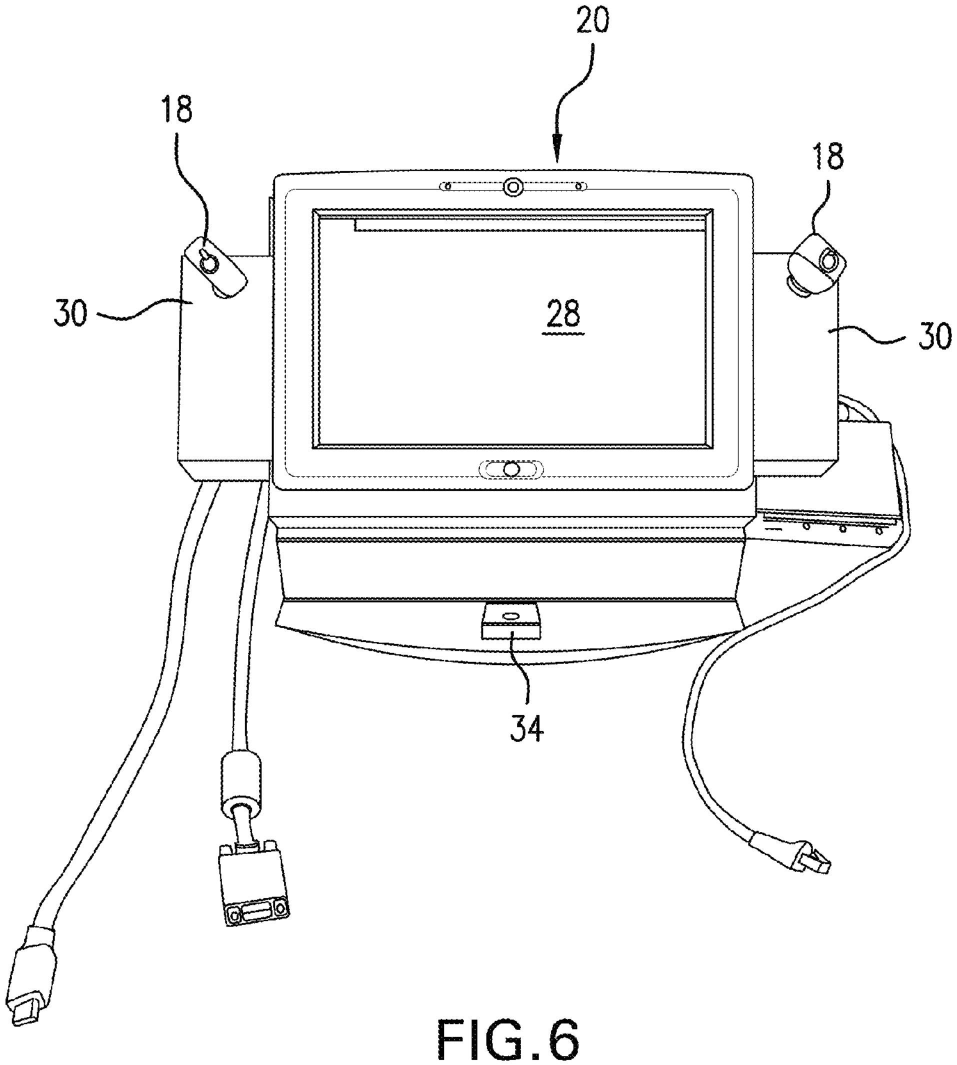
FIG. 6 is a front view of the terminal illustrated in FIG. 4, with two electronic keys as illustrated in FIG. 5 in place in key retention units that are preferably component parts of the terminal.

A terminal 20 in accordance with the invention is illustrated in FIGS. 4 and 6, and includes a screen 28 and at least one key retention unit 30. In the particular terminal illustrated in FIGS. 4 and 6, two key retention units 30 are provided as a part of the terminal 20. In FIGS. 4 and 6, electronically programmable keys 18 are illustrated resident within key retention units 30 of terminal 20.

Terminal 20 further includes a biometric sensor, preferably a fingerprint sensor, which may be positioned as illustrated at 34 in FIGS. 4 and 6. Alternatively, the fingerprint sensor may be a separate unit, removed from screen 28 of terminal 20, but located in close proximity thereto and electronically connected to the software as is terminal 20 for display of the relevant screens provided by the software on screen 28 of terminal 20.

Terminal 20 preferably includes a key retention unit 30 having receptacles for one or more programmable electronic keys 18. When a customer goes to the terminal 20 and identifies himself or herself by some biometric means, preferably by supplying a fingerprint read by the fingerprint reader part 34 of terminal 20, an electronic key 18 is released and the customer is permitted use of the key 18 to open the customer's container 26.

The preferred programmable electronic key 18 fits into terminal 20 and specifically into the key retention unit 30 where the key 18 is charged whenever it is in place within the terminal 20. A rechargeable battery within the key 18 assures that the key 18 is always fully charged. One key 18 can perform up to 800 container openings on a single charge after being removed from the terminal 20. Preferably the terminal can house a plurality of keys 18 simultaneously.

Authorized customers and authorized employees of the supplier must present their previously enrolled biometric identifier, typically a fingerprint, in order to activate and use the key 18 provided at the terminal 20. Once activated, the key 18 may be removed from the key retention unit 30 of the terminal 20 by the customer (or by an authorized employee) in order to gain access to the container(s) 26 to which that customer is authorized to have access. The key 18 remains programmed for a predetermined amount of time and is rendered inactive after returned to the terminal 20 or after the predetermined amount of time expires. When the key 18 is rendered inactive, it is rendered inactive for that particular customer. For the customer to reactivate the key 18, the customer must place the key 18 back into the key retention unit 30 of the terminal 20 and reenter the customer's biometric identifier for identification of the customer by the software. The software permits access only by a specific customer to a container 26 based on that customer's biometric identifier. The software does not permit access to a container 26 by a customer using the programmable electronic key 18 based on what the customer might have in the customer's possession, such as a key fob or card, or what the customer might know, such as a personal identification number code. While fingerprint is the preferred biometric identifier, hand geometry, eye iris characteristics or DNA characteristics may also be used.

The software may be configured for use with many types of containers such as self-serve safe deposit boxes, lockers in educational institutions, vending machines on a sales route, and the like. Once the software is set and the terminal configured for a given application, that mode of application may not be changed.

The preferred fingerprint reader portion of the terminal is preferably supplied by Digital Persona.

One of the functions performed by the software of the invention is to enroll new customers into the system. Initially, the customer provides the customer's name, including the first name, the middle initial, and the last name, the customer's address, the customer's city, state and zip code, the customer's telephone number and type of telephone. The customer preferably supplies, but is not required to supply, an e-mail address, an identification number and a personal identification or PIN number.

The customer then places the customer's appropriate finger on the fingerprint reader 34, whereupon an image of the finger is put into the system and stored by the software. The customer may enroll up to all ten of his or her fingers the software using the fingerprint reader 34. When a desired finger or fingers are selected, the desired finger must be presented to the reader 34 a number of times, preferably four times.

If the fingerprint is read correctly, the appropriate number of the finger is preferably highlighted on the screen 28 of terminal 20, preferably in blue. The screen 28 is preferably an integral portion of the terminal 20. If the finger is not read correctly as to the fingerprint, a failure notice appears on the screen portion 28 of the terminal 20 and the finger must be presented again. After successfully presenting the finger four times, this success is displayed as feedback on the screen 28 of the terminal 20. The option is provided for the customer to present additional fingers as desired and in each case, the finger must be presented four times for the fingerprint to be read and verified correctly.

Once the fingerprint enrollment process has been completed for a given customer, the next step is to select a container 26 to be rented by that customer and to define a rental term, in months, for the selected container 26. Selecting a container 26 is optional, in that the customer may be entered into the software to become a co-owner of an already rented container 26 or an authorized user of a container 26 already rented by another customer.

Once the customer enrollment process is completed, the customer preferably clicks on a "Finish" button, which is preferably on a touch screen portion of terminal 20, to save the information into the software. If a container has been selected for the customer, the selected container is ready to be "commissioned." The customer must present the customer's fingerprint to the sensor of terminal 20, remove one of the electronic keys 18 from terminal 20, and access container 26 using the appropriate electronic key. After opening container 26 and re-docking electronic key 18 at terminal 20, container 26 is considered to be rented. Of course, container 26 to be rented by the customer may be selected for the customer by an employee of the supplier, who must also supply his or her fingerprint information before the software will permit that individual to participate in the selection process, if this optional feature is included in the software.

Each container has a state variable associated with it. The state variable may be that the container is ready to be rented, or that the container may be awaiting commission, in which case the rental process has begun and the customer must access the container for the first time; or that the container state variable may be rented, in which case the rental process is active and the customer has accessed the container at least one time; or that the container state variable may also be that of awaiting decommission, in which case the rental process is ending and the customer must access their container one final time.

Customers may edit their information, such as when a customer's address changes. In such case, the customer again presents the customer's fingerprint for verification. Once the fingerprint has been verified, a screen page preferably appears permitting the customer to change the relevant information, such as the customer's address. The screen page preferably appears on screen 28 of terminal 20. Upon completion of editing the information, the touch screen may be touched and the "Save" function activated, whereupon the customer must again present the customer's finger to verify that the correct customer is saving the information that has been changed.

When a customer desires to renew the rental term for an existing container that is rented, the customer may present the customer's fingerprint to fingerprint reader portion 34 of terminal 20, whereupon the "Edit Customer Information" appears, and the customer may click or press a touch screen a code for "Renew Container", which brings up information and a screen via which the customer may select the appropriate container 26 if the customer has rented more than one container 26. The customer may define the new renewal term, in months, and thereupon may instruct that that information be saved by pressing the appropriate "Save" portion of the touch screen. If the customer has rented more than one container, the rentals of the additional containers may be renewed by selecting another container 26 from the information presented on screen 28 at terminal 20 and repeating the process as set forth hereinabove.

When a customer wishes to surrender their container 26, the supplier may decommission the container. The supplier employee, after presenting his or her finger for verification at the terminal, clicks on an "Edit Customer" button, or preferably a touch screen indicator, and thereafter identifies the customer by clicking on or touching a "Retrieve User" indicator. At this point, the collection of currently assigned containers is populated in a grid. To decommission the relevant container, the supplier employee clicks on or touches a "Decommission" indicator within an appropriate row of the grid of currently assigned containers. Next, the supplier representative or employee clicks on or touches a "Decommission Lock" indicator on the touch screen. The customer then presents his or her finger for verification of the customer identity again, and the status of the container is changed to "Awaiting Decommission." The customer then removes the appropriate electronic key 18 from terminal 20 and accesses the customer's container 26 one last time. Once the customer has done this and electronic key 18 is returned and docked at terminal 20, the customer's container is placed back into the "Available" state, whereupon container 26 may be rented to another customer.

When the need arises to halt access to a container and nevertheless keep the container in a rented state, the container may be put into a "Suspended" status. The software does not permit a customer to put the container into "Suspended" status; only personnel of the supplier may suspend or unsuspended a container.

To start the process of suspending a container, a representative of the supplier whose identity has been fingerprint verified clicks on a "Configuration" button or preferably a touch screen indicator and selects a tab labeled "Container Management." To suspend the container, the identity verified representative of the supplier selects the container from a drop-down list, using the keyboard of the terminal, types a brief reason as to why the container is being suspended, and then clicks or preferably touches a "Suspend" indictor on the touch screen.

To put the container back into an active state, a fingerprint identity verified representative of the supplier on the drop-down menu places a checkmark in an area on the preferable touch screen for "All Containers," whereupon a drop-down list of the containers appears and the container may be selected by the fingerprint identity verified representative of the supplier. The representative of the supplier then types a brief reason as to why the container is being resumed and been placed back into an active state and clicks or touches the "Resume" key or area of the preferable touch screen to place the container back into active status.

In the event a container must be forcibly closed and deactivated without the customer present, the lock within the container must be deactivated and the container must be forced open, whereupon the current lock in the container will no longer function. To start the process using the software of the invention, the representative of the supplier clicks on a "Configuration" tab or portion of the touch screen from the main menu and selects a tab labeled "Container Management." At this point, the representative of the supplier selects a container from the drop-down list and provides a reason for the deactivation. Fingerprint identity verification must be made by the supplier representative, as described above, before deactivating any container.

The software of the invention further provides the capability to add a co-owner or co-customer associated with an existing container that is already rented. In such case, the customer, who is the original customer, must be present and the new co-owner or co-customer must be already enrolled, having presented the co-customer's fingerprint and identifying information as described above. To then add the co-customer, from the main menu, one clicks or presses on the "Edit Customer" indicator, whereupon the customer is identified by clicking or preferably touching on the "Retrieve User" indicator, and when identification has been made, one clicks on the "Co-Owner" indicator on the preferred touch screen. A grid of currently assigned containers appears on the screen and is populated with the containers that are currently assigned to the customer. The co-customer or co-owner may be added to one or more containers by selecting the tab or preferable touch screen indicator of "Add Co-Owner" for the appropriate container, whereupon one clicks on the "Add Co-Owner" button or touches the preferable touch screen, and fingerprint identification verification must be performed again, as set forth above.

The software of the invention further provides for removal of a customer if a container is indicated to have multiple customers or owners. At least one customer must be present to remove another customer. For this process, the customer, from the main menu, touches or clicks on the "Edit Customer" indicator, whereupon the customer is identified by clicking on or touching the "Retrieve User" indicator. After identification of the customer has been made, the "Co-Owner" tab is clicked on or touched, whereupon the currently assigned container grid appears on the terminal screen and is populated with the containers assigned to that particular customer.

Removing a customer must be performed on one container at a time, but removing multiple owners may be performed all at once for a single container. A customer clicks on or touches the appropriate row within the currently assigned containers grid. The customer or owner grid automatically populates with the existing customers or owners. The customer then selects which customer to remove by placing a check in the "Remove Co-Owner" column, and clicks or touches the "Remove Co-Owner" button or area on the touch screen. In all cases, fingerprint verification must be made again, as described above, before a customer may be removed from a container.

The software further facilitates addition of an authorized user to an existing container. The add an authorized user to an existing container, the customer for that container must be present and the authorized user must be enrolled, having submitted the authorized user's fingerprint and identifying information as described above for the customer.

To add the authorized user, from a main menu, one clicks on the "Edit Customer" button or portion of the touch screen. The customer is then identified by clicking on the "Retrieve User" button or portion of the touch screen. Once fingerprint verification identification has been made, the authorized user tab or portion of the touch screen is activated. The currently assigned container grid appears on the screen and is populated with the containers assigned to the customer. An authorized user may be added to one or more of the containers for that customer. The authorized user is added by selected the "Add Authorized User" container in the grid for the appropriate containers, whereupon the customer clicks on the "Add Authorized User" button or portion of the preferable touch screen. In all cases, fingerprint identification verification must be performed first, as described above.

The software further provides capability to remove an authorized user from a container, in which case the customer for the container must be present. Fingerprint identification verification must be performed as indicated above.

Once that has been done, from the main menu, the customer clicks or touches on the "Edit Customer" area of the screen and identifies himself or herself by clicking on the "Retrieve User" area and then after fingerprint verification identification has been made, clicks on the "Authorized User" area. A currently assigned container grid appears and is populated with the containers assigned to that customer. Removing an authorized user from a container must be preformed on one container at a time. However, removing multiple authorized users may be performed all at once, on a single container. This is done by clicking on the appropriate row within the grid of currently assigned containers. The authorized user grid appears and automatically populates with existing authorized users. At that point, the fingerprint verification identified customer selects which users to remove by placing a check in the "Remove User" column, and then clicks on the "Remove Authorized User" button or area of the preferred touch screen.

When another new container is to be rented to an existing customer, from the main menu the "Edit Customer" selection is made. The customer is then identified using the "Retrieve User" button or area on the preferred touch screen and after identification has been made, the customer or a representative of the supplier clicks on the "Containers" tab or an area of the preferred touch screen.

The software then displays two grids, namely the grid of "Currently Assigned Containers" and a grid of "Available Containers." In order to assign an available container to the customer, the supplier employee or representative clicks on "Select" within the appropriate row of available containers, whereupon the container defined by that particular row is added to the customer's profile. At that point, the employee or representative of the supplier clicks on the "Assign Container" button or area of the preferred touch screen, whereupon fingerprint identification verification must be made again by the customer. Renewal terms must be defined. After that information has been saved, the mode for the particular container selected is set to "Awaiting Commission." The customer must then proceed by retrieving the key from the terminal and accessing the container of interest in order to commission the container.

The software of the invention allows customers to update their fingerprint template at any time. To begin from the main menu, a customer clicks on the "Edit Customer" button or portion of the preferred touch screen, and the customer is identified using the "Retrieve User" function. After fingerprint identification verification has been made, the fingerprint tab is selected. To remove data for an existing fingerprint, the customer clicks on the highlighted finger. To add a fingerprint, the customer clicks on any finger and follows the enrollment process described above. Once this procedure has been finished, the customer clicks on the "Save" button or portion of the preferred touch screen.

The software deals with new employees of the supplier and permits enrollment of them by providing a screen for insertion of information for a new employee. Specifically, the new employee's first name, middle initial and last name are required, as is the principal name of the supplier. An optional field is provided for an employee number, as is an optional field provided for a PIN number for the employee and an e-mail address for the employee.

An option is provided to designate the supplier employee as an administrator within the software of the invention. There is further provided an indicator for the supplier employee if that employee is to be authorized to perform maintenance at the terminal. Furthermore, if that employee is to have the ability to add further employees to this system, or to maintain existing employees by editing their information, those indicators are also provided on a new employee permission screen. The software further provides for flagging the employee as a temporary employee, and if the employee is indicated to be a temporary employee, the date that the employee's access to the system is to expire is entered into the system. The new employee is required to provide his fingerprint in order to enroll, following the procedure as set forth above for enrollment and identification of customers by their fingerprints. As with the customer identification, once an appropriate finger is selected by the employee, it must be presented to the fingerprint reader four times. If the fingerprint is read correctly, the appropriate number of the finger is highlighted on a screen of the terminal. Otherwise, a failure notice appears and the finger must be presented to the fingerprint reader again. After successfully presenting the finger four times for fingerprint reading, a successful dialogue feedback is displayed on a screen of the terminal. Additional fingers may be entered as required or desired.

To assign responsibility for given containers to an employee of the supplier, a checkmark is placed in a selected column in the container listing. Containers need not be assigned at that time. To complete the employee's enrollment process, one clicks on or presses the preferred touch screen indicator for "Next" and then a "Finish" button or touch screen indicator on the screen of the terminal.

To edit an existing employee, one selects a name from a drop-down list of employees. Afterwards, the appropriate field for that employee is populated. For example, the employee may be one flagged as an administrator with terminal access. The employee may be a temporary employee, having a key duration of 500 minutes, and not having access to any containers.

The software and the terminal requires time synchronization service to insure the date and time are accurate. Preferably five public time sync servers are defined within the database. Depending on local firewall rules however, use of public time sync servers may not be allowed. Accordingly, the supplier's time sync server may optionally be permitted to coordinate with the software of the invention. For time synchronization, a tab or touch screen indicator of the same is selected. The software allows activation of an existing inactive time sync server and allows insertion of a new time sync server once the host name or IP address, port number, and any comments are entered. Once this has been done, the next time the watchdog service tries to perform time synchronization, the newly added time sync server will be used. Only one time sync server must be active at any one time in connection with operating the software of the invention. Software and database update functions are performed using conventional security tokens and conventional updating and storage procedures.

Keys may be added to the software of the invention. The key serial number and encryption data from the dealer and a short description of the key are required. Only administrators designated by the supplier can add and deactivate keys from the software of the invention.

The false acceptance rate (FAR), also known as the security level, is the proportion of fingerprint verification operations by authorized users that incorrectly return a comparison decision of "a match." The FAR is typically stated as the ratio of the expected number of false accept errors divided by the total number of verification attempts, or the probability that a biometric system will falsely accept an unauthorized user. A probability of 0.001 (or 0.1%) means that out of 1,000 verification operations by authorized users, a system is expected to return one (1) incorrect match decision. Increasing the probability to 0.0001 (or 0.01%) changes this ratio from 1 in 1,000 to 1 in 10,000.

Increasing or decreasing the FAR has the opposition effect on the false reject rate (FRR). Specifically, decreasing the rate of false accepts increases the rate of false rejects and vice versa. Therefore, a high security level may be appropriate for an access system dealing with a secured area, but may not be acceptable for a system for an area where convenience or easy access is more significant than security.

The preferred default value of the software in accordance with the invention is set at 4,295, which equals a FAR probability of 1 in 500,000.

The following examples illustrate operation of the invention. The examples are presented to provide the reader with a clear appreciation and understanding of the invention. The presented examples are all non-limiting. No inference should be drawn from the examples respecting any limitations associated with or inherent in the invention. The scope and breadth of the legal rights of exclusivity to which the invention is entitled are defined by the appended claims when construed in accordance with applicable law.

Example 1

Add New Customer

Figure 10:
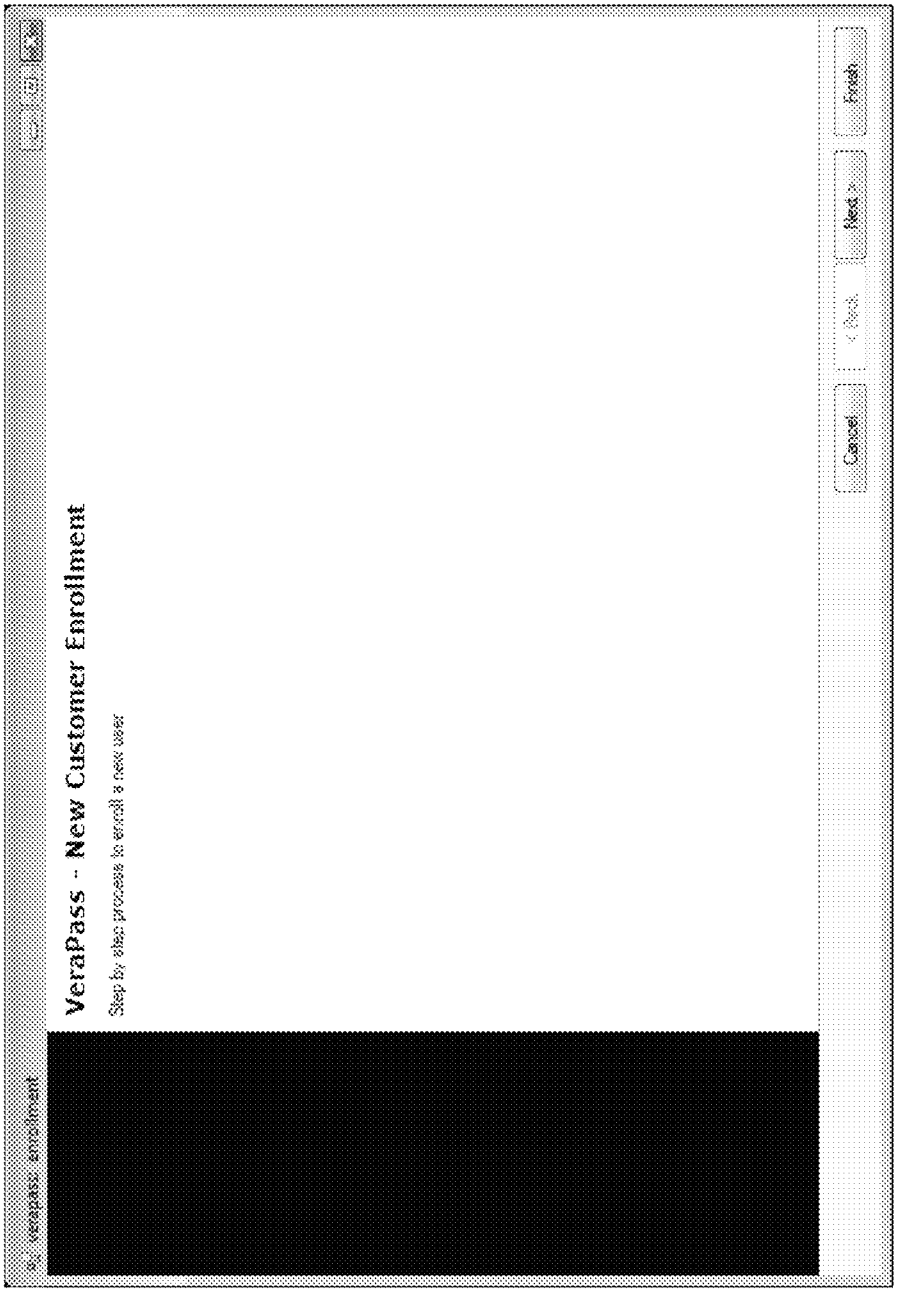
FIGS. 10 through 40, respectively, represent Screenshots A through AE which are depictions of images appearing on the screen of the terminal in the course of practice and operation of various aspects of the invention, as described in Examples 1 through 23 hereinbelow.

After clicking the button on the main menu labeled New Customer, the customer enrollment wizard is displayed (see SCREEN SHOT A, FIG. 10).

The wizard is a step-by-step process to enroll a new customer into VeraPass. To start, click the "Next" button.

Figure 11:
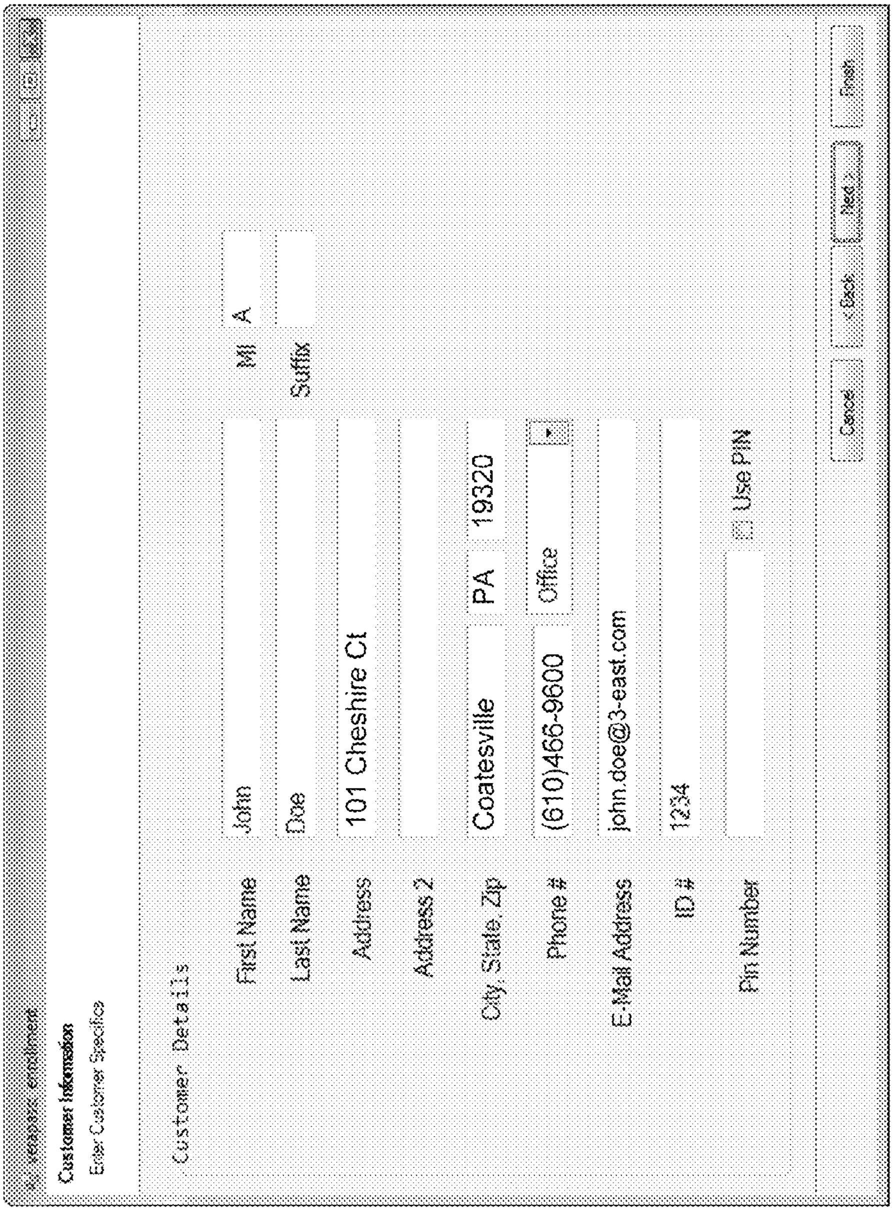

The customer details form contains the following fields (see SCREEN SHOT B, FIG. 11):

- Name: First, Middle Initial, Last, and Suffix
- Address Lines
- City, State, and Zip Code
- Phone Number and Type of Phone
- Email Address
- ID Number
- Pin Number (if a PIN is desired, ensure "Use Pin" is checked).

Middle initial, name suffix, email address, ID number and PIN number are all optional fields.

Figure 12:
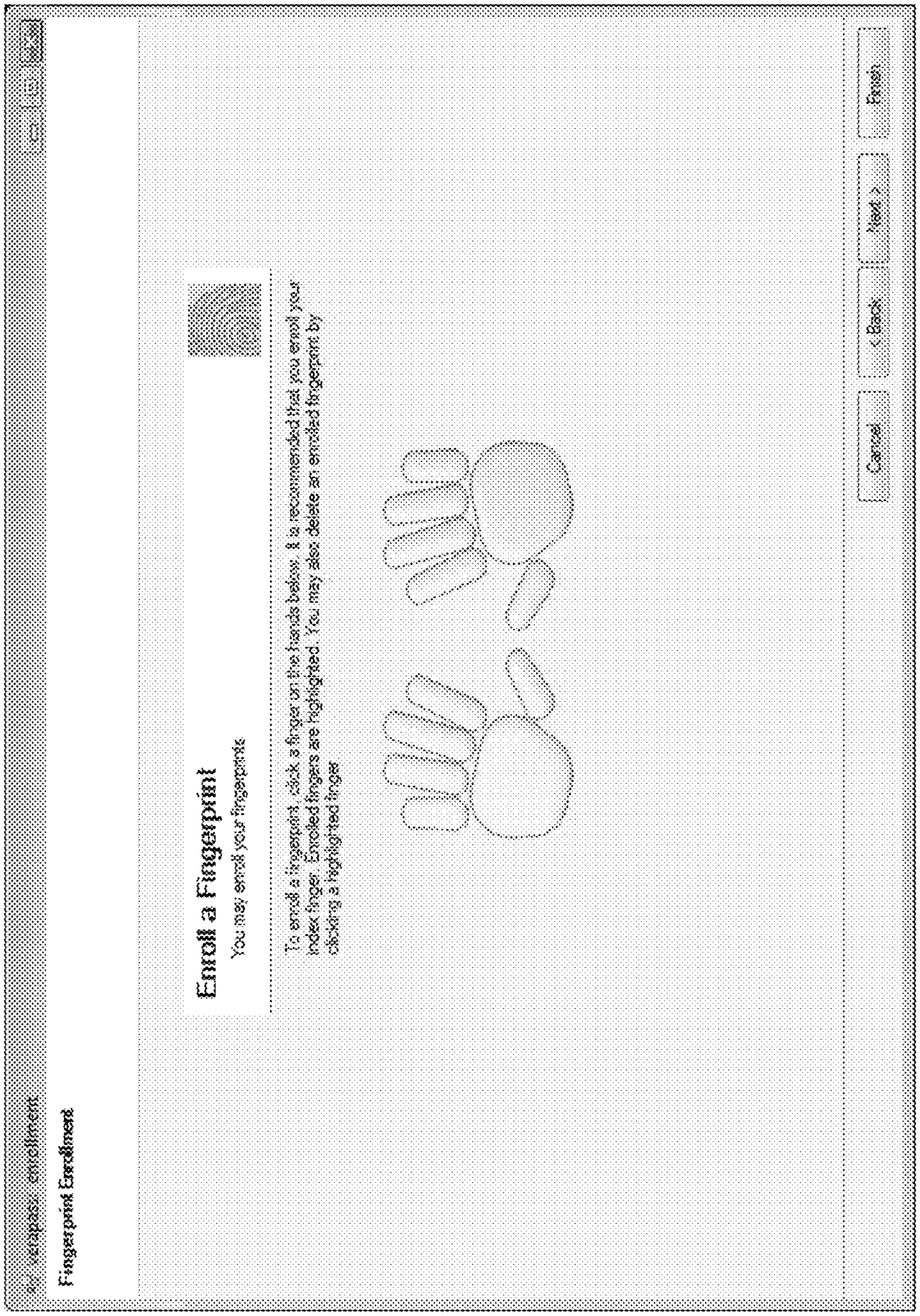

To enroll a fingerprint, click on the appropriate finger to enroll (SCREEN SHOT C, FIG. 12). Up to ten (10) fingers may be enrolled. A minimum of two (2) fingers per customer is recommended.

Figure 13:
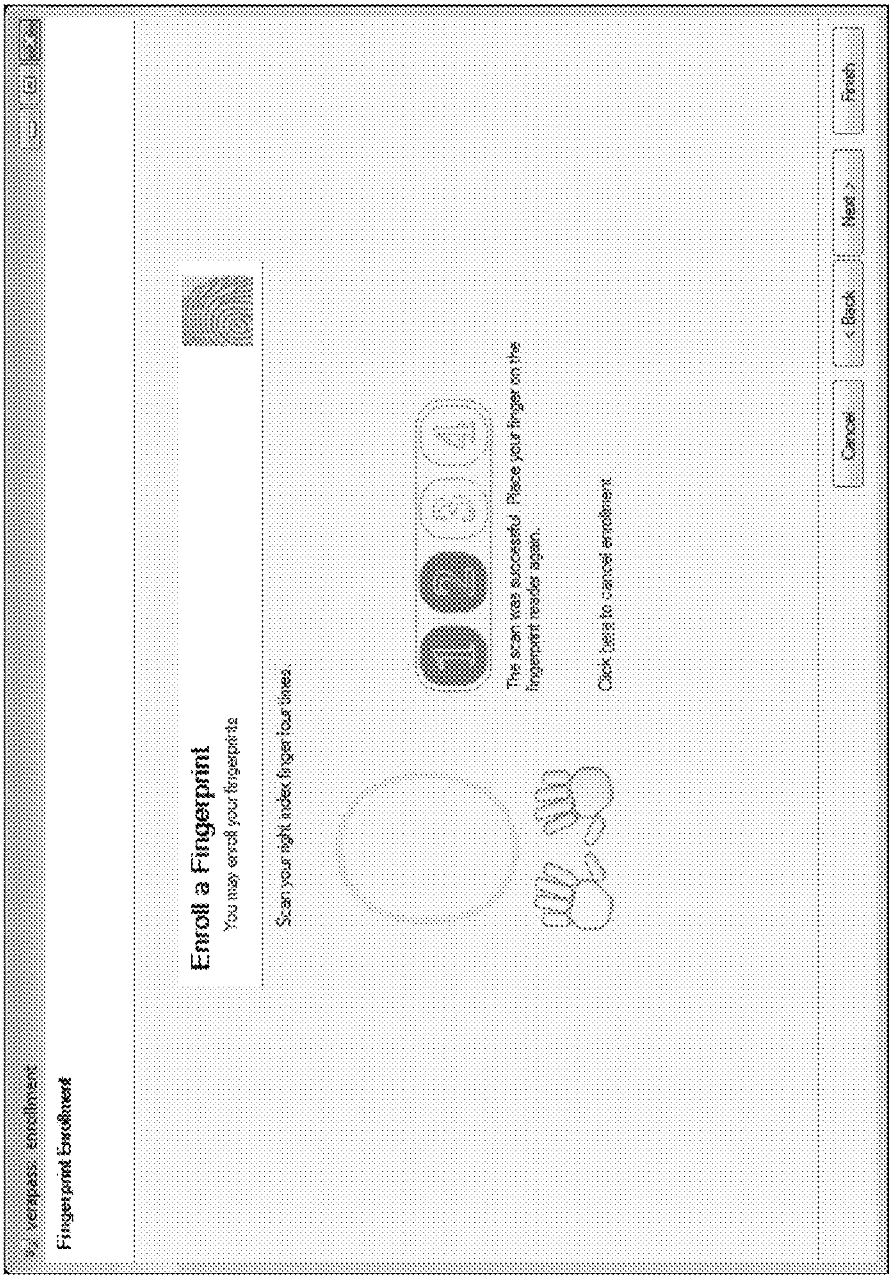
Figure 14:
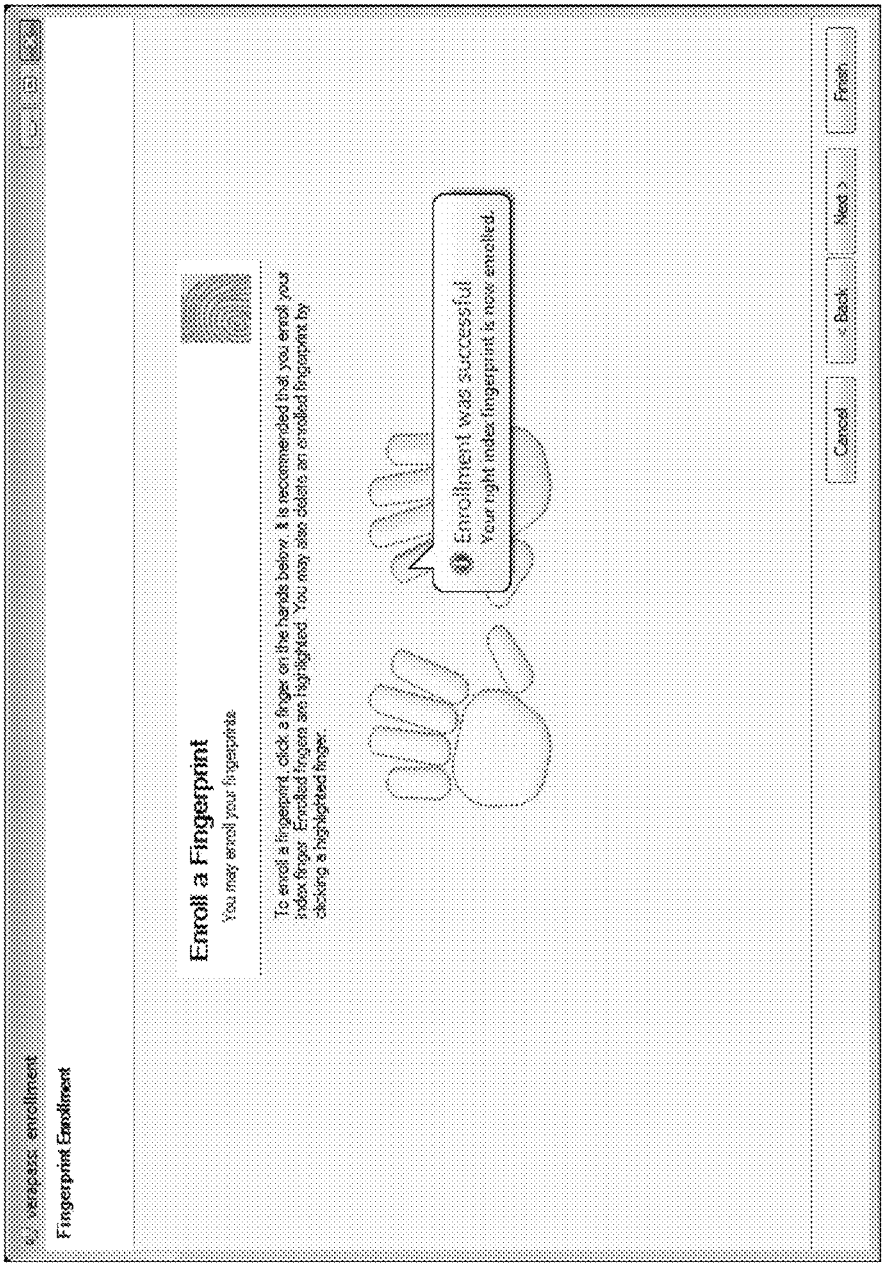

Once the desired finger is selected, it must be presented four (4) times. If the fingerprint is read correctly, the appropriate number is highlighted in blue (SCREEN SHOT D, FIG. 13). Otherwise, a failure notice appears and the finger must be presented again. After successfully presenting the finger four times, the successful feedback is displayed (SCREEN SHOT E, FIG. 14). Click on additional fingers as needed. Hit "Next" when this step is completed.

After the fingerprint enrollment process is completed, the next step is selecting a container and defining a rental term, in months. Please note, selecting a container is optional—the customer may be entered into VeraPass to become a co-owner of an existing container or an authorized user of another customer—refer to the appropriate section for details. The container(s) is selected by placing a check in the "select" container and entering the number of months agreed upon for the rental in the column entitled "Term (in Months).

Figure 15:
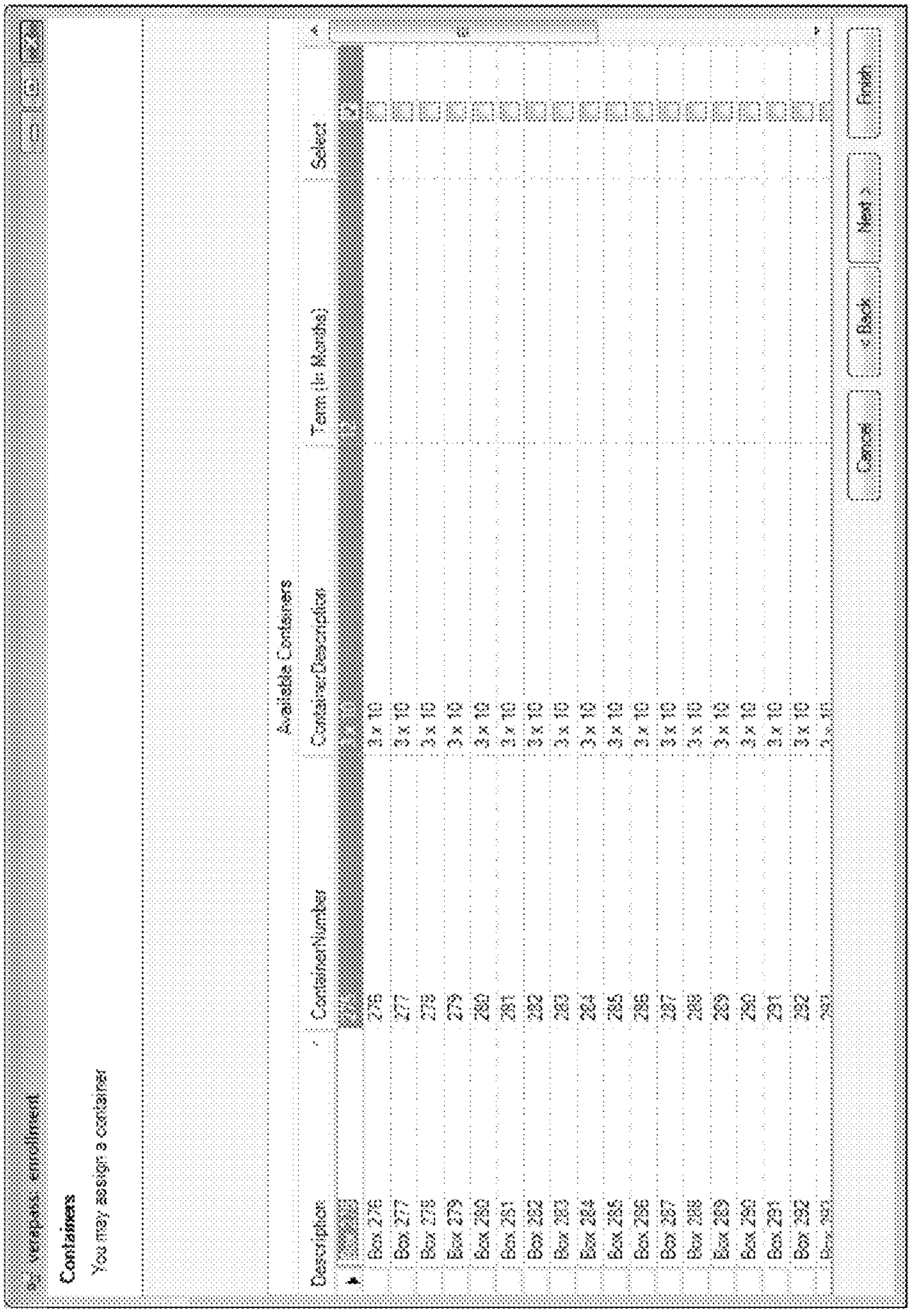

Once the customer enrollment process is completed, click the "Finish" button to save the information into VeraPass (see SCREEN SHOT F, FIG. 15).

Figure 16:
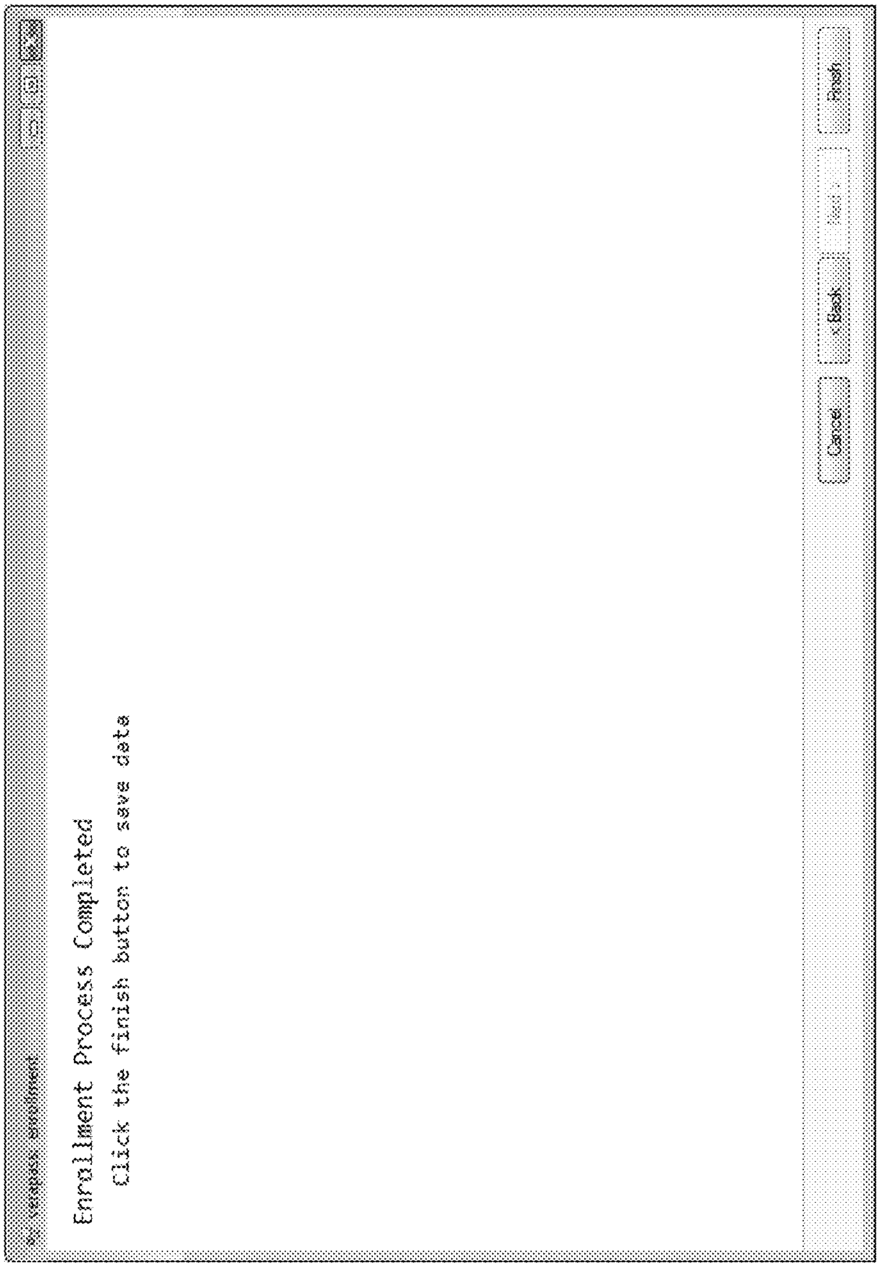

If a container was selected for the customer, it is ready to be commissioned. The customer must present their fingerprint to the kiosk, remove the appropriate key, and access the container. After opening the container and docking the key at the kiosk, the container is considered to be rented (see SCREEN SHOT G, FIG. 16).

Container States

- Available
- Ready to be rented

Awaiting Commission

Rental process has begun; customer must access their container for the first time Rented Rental process is active; customer has accessed their container at least one time Awaiting Decommission Rental process is ending; customer must access their container one last time Example 2

Editing Customer

From the main menu, select "Edit Customer." Once the maintenance form appears, select "Retrieve User." Afterwards, the customer must present their fingerprint for verification.

Figure 17:
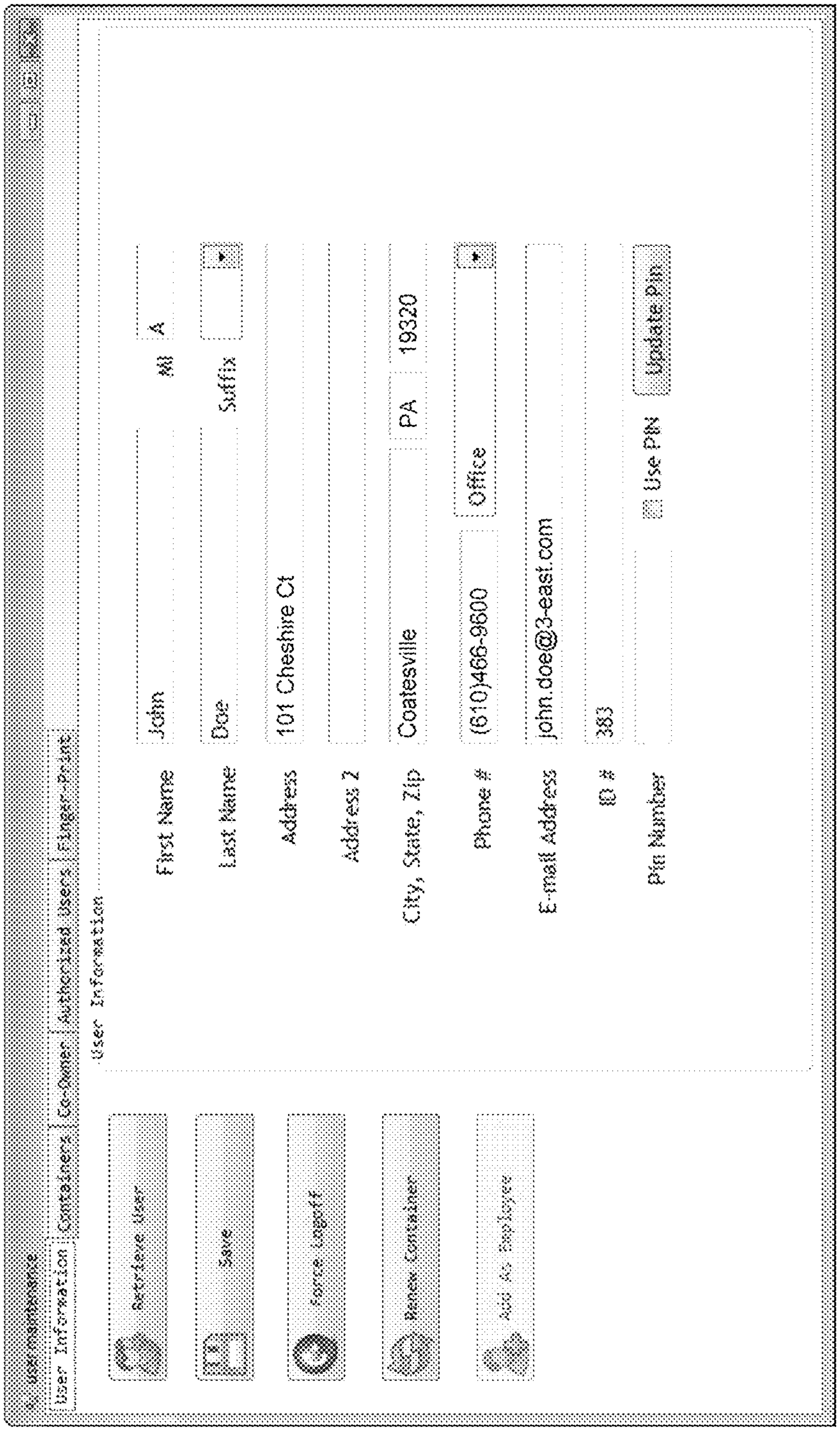

Any of the fields may be changed (see SCREEN SHOT H, FIG. 17). Once changed, click the "Save" button. The application prompts you for a fingerprint as verification.

Example 3

Renew Container Rental Term

To renew a rental term for an existing container rental, select "Edit Customer" from the main menu. Next, click on the "Renew Container" button. Customer identification via fingerprint is not required to renew the rental term.

Figure 18:

Select the appropriate container from the drop down list. The owner's name(s) appear along with the date opened and current expiration date. Define the new renewal terms, in months, and click the "Save" button (SCREEN SHOT I, FIG. 18).

Additional containers may be renewed by selecting another container and repeating the process outlined above.

Example 4

Surrender Container

Voluntarily

When a customer wants to surrender their container, you may decommission their container. To start, click on the "Edit Customer" button from the main menu. Next, the customer must be identified by clicking on the "Retrieve User" button.

Figure 19:
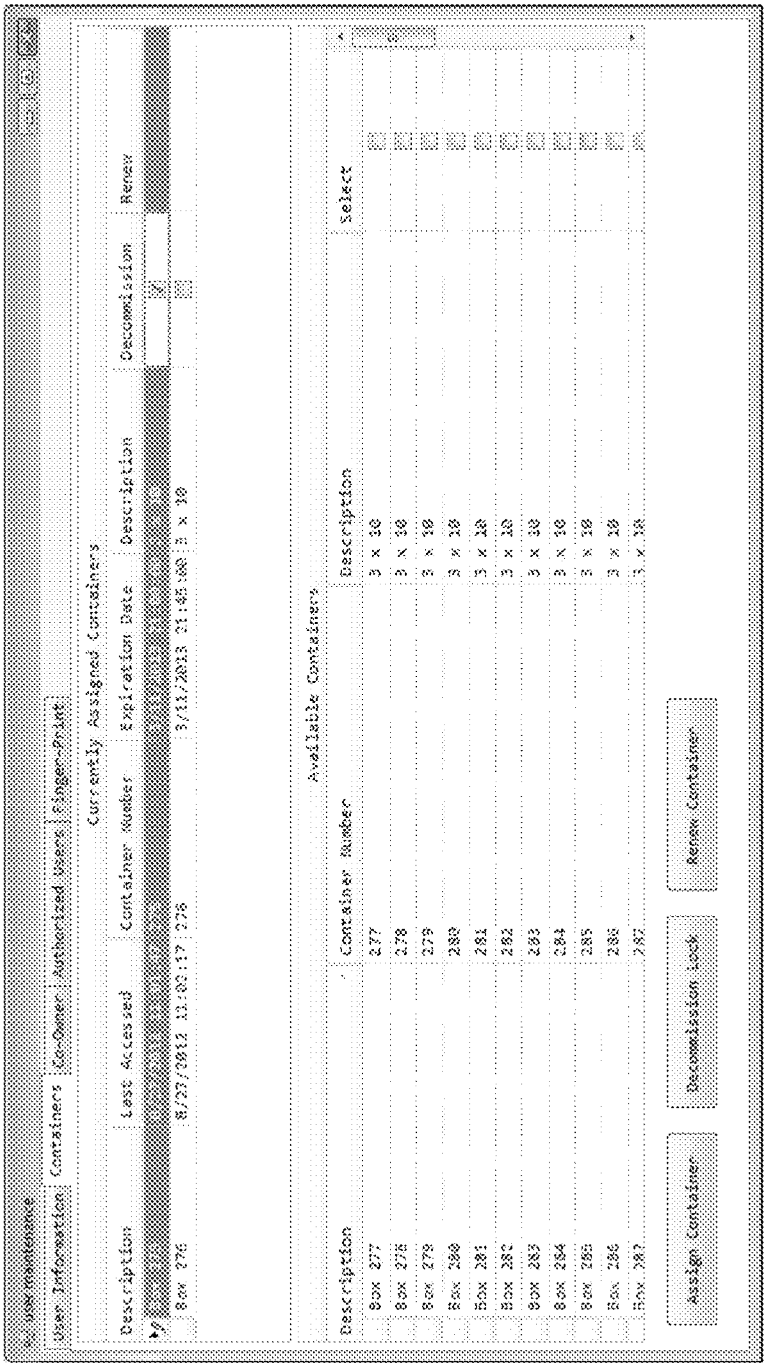

Within the Containers tab, the currently assigned containers grid is populated. To decommission the container, click on the "Decommission" field within the appropriate row. Next, click the "Decommission Lock" button (SCREEN SHOT J, FIG. 19).

Fingerprint verification must be made again. Follow the prompts as needed. At this point, the status of the container is placed into the Awaiting Decommission state. The customer must go to the kiosk and present their finger, remove the key, and access their container one last time. Once that is completed and the key is docked at the kiosk, the container is placed back into the Available state.

Example 5

Suspending and Resuming a Container

When the need arises to halt access to a container and keep it in the Rented state, the container may be suspended. The customer does not need to be present in order to suspend a container. Only administrators may suspend or resume a container.

To start the process, click "Configuration" from the main menu and select the tab labeled Container Management.

Suspending

Select a container from the drop-down list

Type a brief reason as to why the container is being suspended

Click the "Suspend" button

Resuming

Place a checkmark in "All Containers"

Select a container from the drop-down list

Type a brief reason as to why the container is being resumed

Click the "Resume" button

Figure 20:
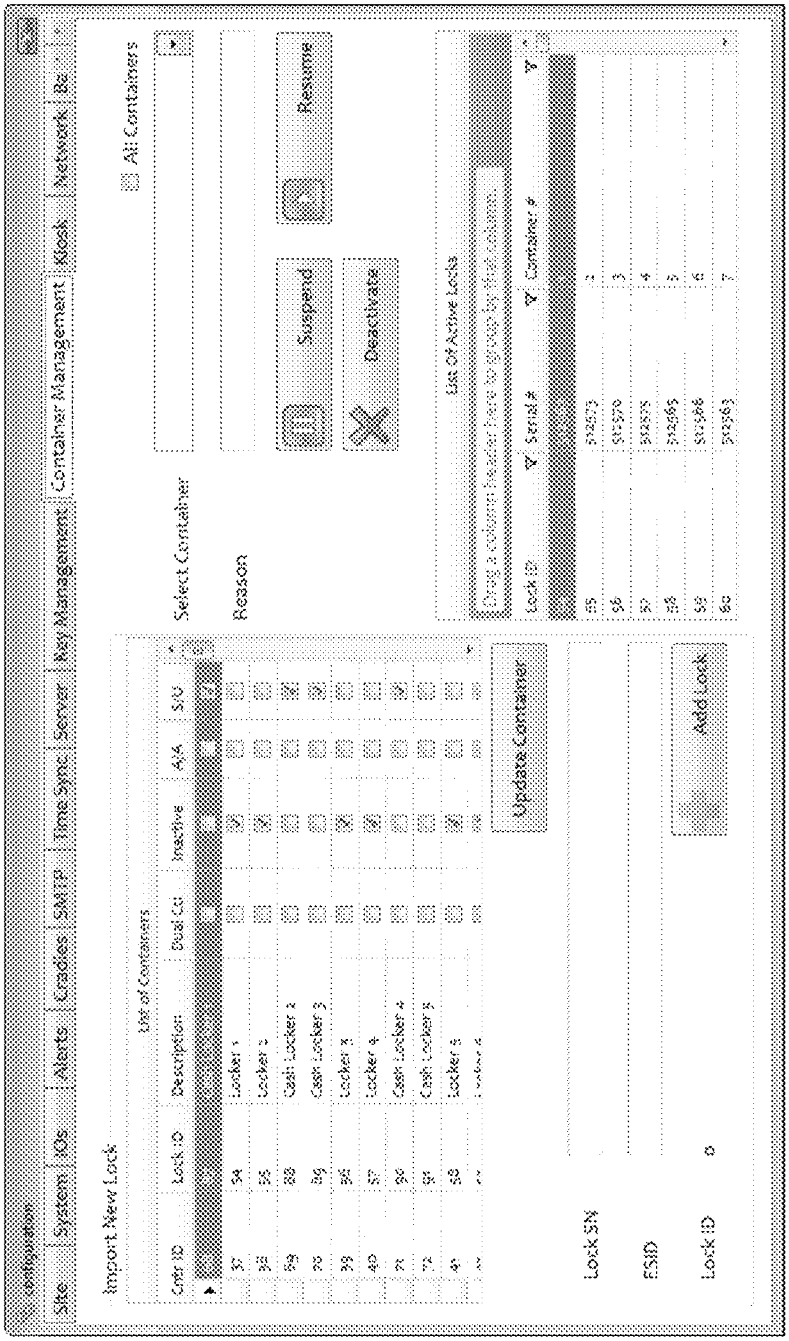

See SCREEN SHOT K, FIG. 20.

Example 6

Deactivating Container

In the event a container must be forcibly closed without the customer being present, the lock within the container must be deactivated. The container will have to be forced open and the current lock will no longer function. This process cannot be reversed. The container must be forcibly opened and a new lock will have to be installed.

To start the process, click "Configuration" from the main menu and select the tab labeled Container Management.

Select a container from the drop-down list and provide a reason for the deactivation. Before you click on the "Deactivate" button.

Figure 21:
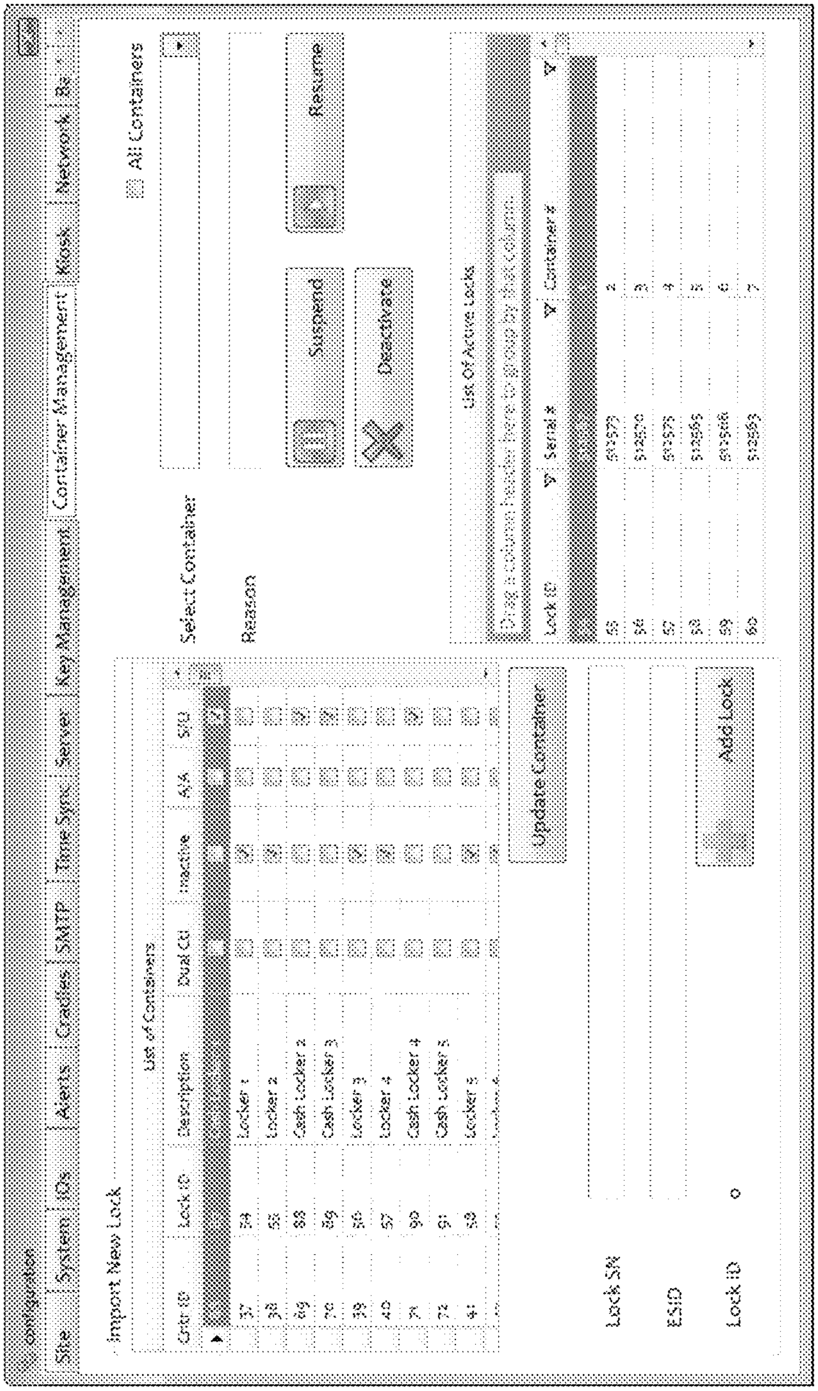

Fingerprint verification must be made again. Follow the prompts as needed (SCREEN SHOT L, FIG. 21).

Example 7

Adding a Co-Owner

In order to add a co-owner to an existing container, the owner must be present, and the co-owner must be already enrolled.

To begin, from the main menu click on the "Edit Customer" button. Next, the customer must be identified by clicking on the "Retrieve User" button. After identification has been made, click the Co-Owner tab.

The Currently Assigned Containers grid is populated with the containers assigned to the owner. Adding a co-owner may be performed on one or more containers. Select the "Add Co-Owner" container for the appropriate container(s). Afterwards, click on the "Add Co-Owner" button.

Figure 22:
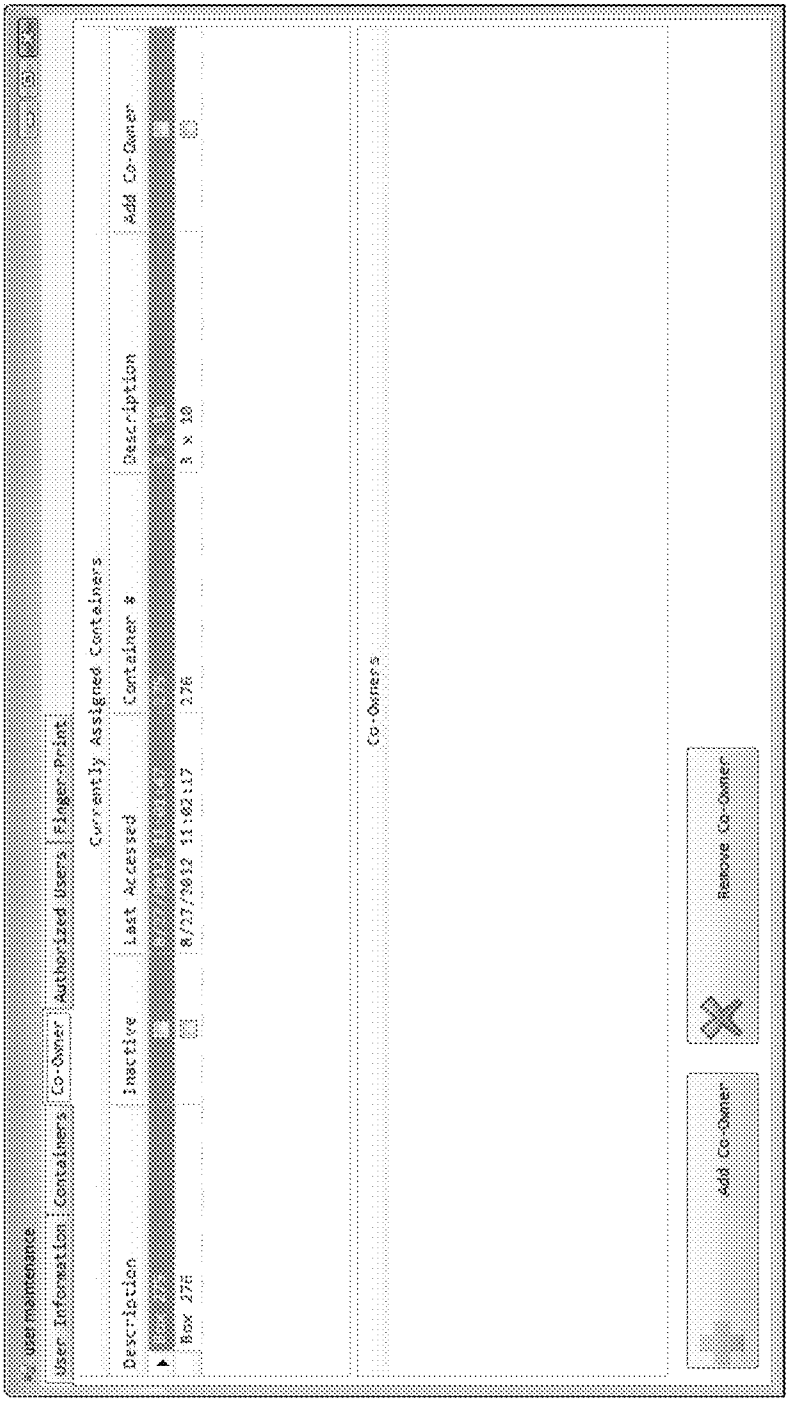

Fingerprint verification must be made again. Follow the prompts as needed (SCREEN SHOT M, FIG. 22).

Example 8

Removing an Owner

To begin, from the main menu click on the "Edit Customer" button. Next, the customer must be identified by clicking on the "Retrieve User" button. After identification has been made, click the Co-Owner tab.

The Currently Assigned Containers grid is populated with the containers assigned to the owner. Removing an owner must be performed on one (1) container at a time. However, removing multiple owners may be performed all at once.

Figure 23:
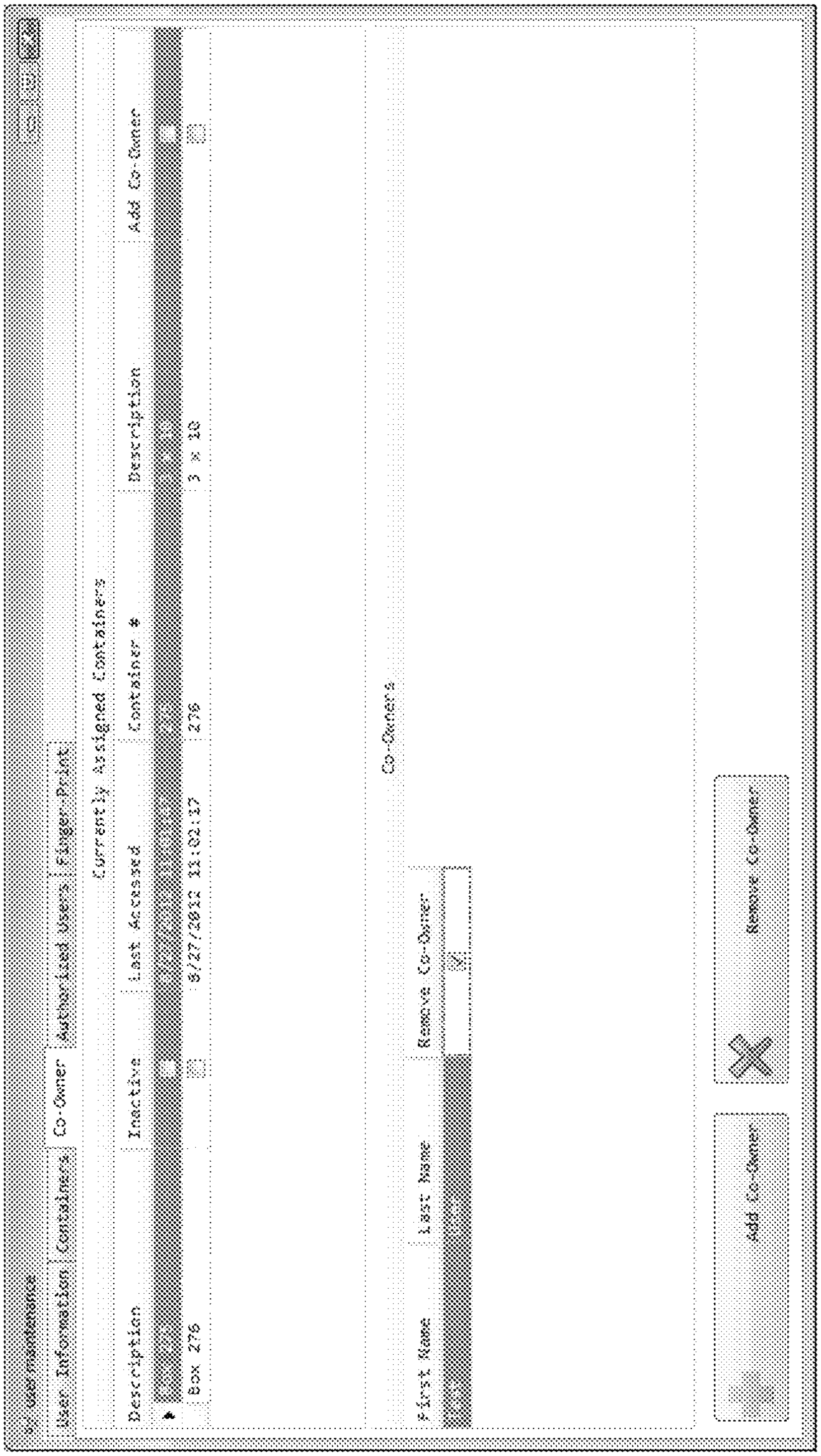

Click on the appropriate row within the Currently Assigned Containers grid. The co-owner's grid automatically populates with the existing owners. Select which owner(s) to remove by placing a check in the Remove Co-Owner column. Next, click the "Remove Co-Owner" button. (SCREEN SHOT N, FIG. 23).

Fingerprint verification must be made again. Follow the prompts as needed. If the container has multiple owners, at least one (1) owner must be present to remove another owner.

Example 9

Adding an Authorized User

In order to add an authorized user to an existing container, the owner must be present, and the authorized user must be already enrolled.

From the main menu click on the "Edit Customer" button. Next, the customer must be identified by clicking on the "Retrieve User" button. After identification has been made, click the Authorized Users tab.

Figure 24:
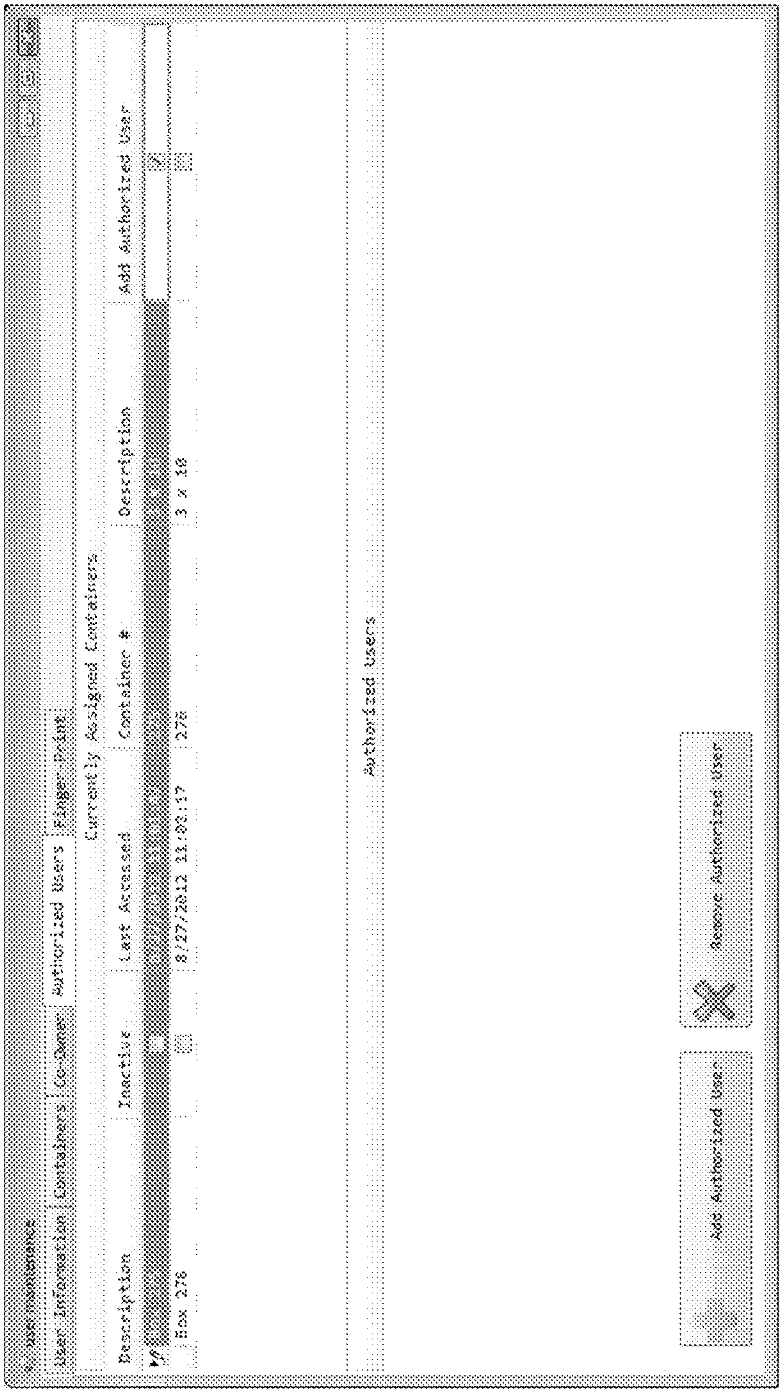

The Currently Assigned Containers grid is populated with the containers assigned to the owner. Adding an authorized user may be performed on one or more containers. Select the "Add Authorized User" container for the appropriate container(s). Afterwards, click on the "Add Authorized User" button. (See SCREEN SHOT O, FIG. 24.)

Fingerprint verification must be made again. Follow the prompts as needed.

Example 10

Removing an Authorized User

In order to remove an authorized user, the owner must be present.

To begin, from the main menu click on the "Edit Customer" button. Next, the customer must be identified by clicking on the "Retrieve User" button. After identification has been made, click the Authorized Users tab.

Figure 25:
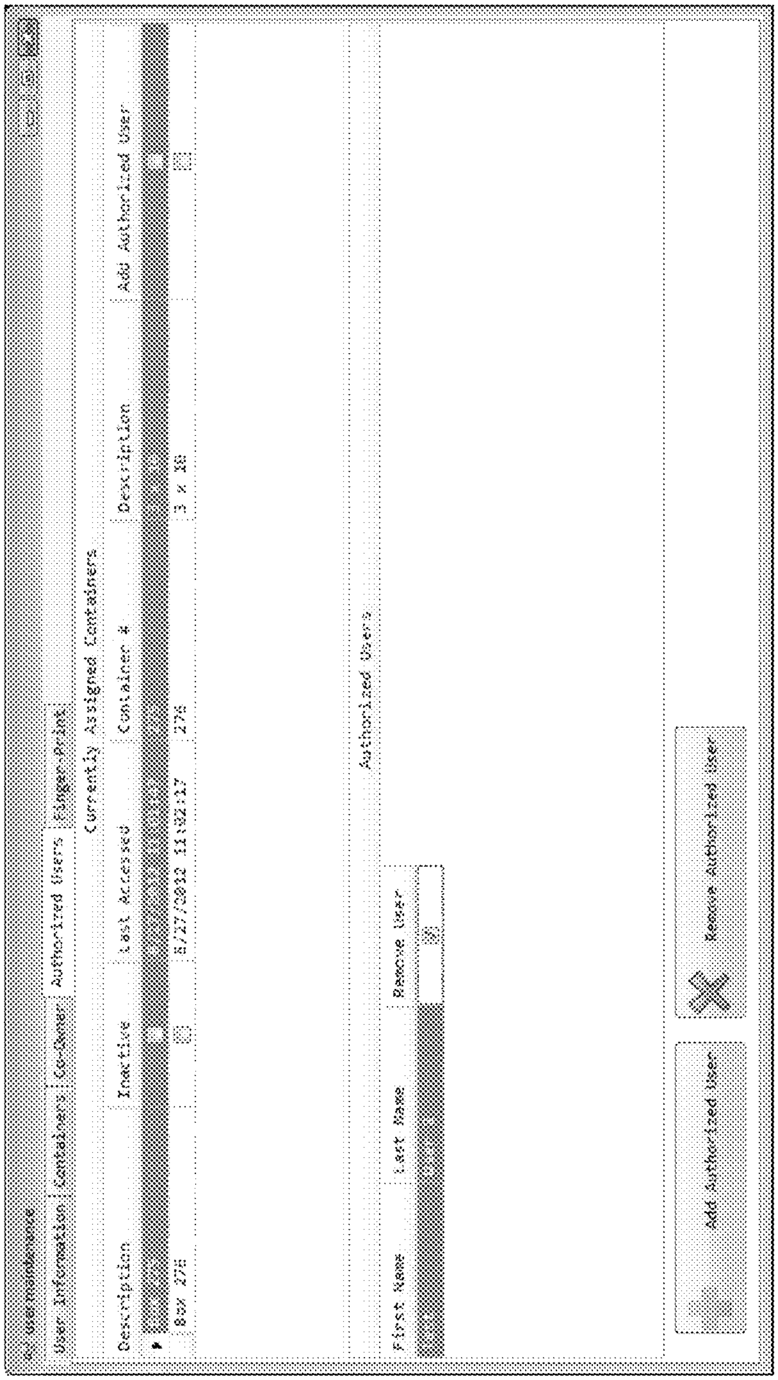

The Currently Assigned Containers grid is populated with the containers assigned to the owner. Removing an authorized user must be performed on one (1) container at a time. However, removing multiple authorized users may be performed all at once. Click on the appropriate row within the Currently Assigned Containers grid. The Authorized User's grid automatically populates with the existing authorized users. Select which user(s) to remove by placing a check in the "Remove User" column. Next, click the "Remove Authorized User" button. (See SCREEN SHOT P, FIG. 25.)

Fingerprint verification must be made again. Follow the prompts as needed.

Example 11

Renting a New Container to an Existing Customer

From the main menu click on the "Edit Customer" button. Next, the customer must be identified by clicking on the "Retrieve User" button. After identification has been made, click the Containers tab.

Figure 26:
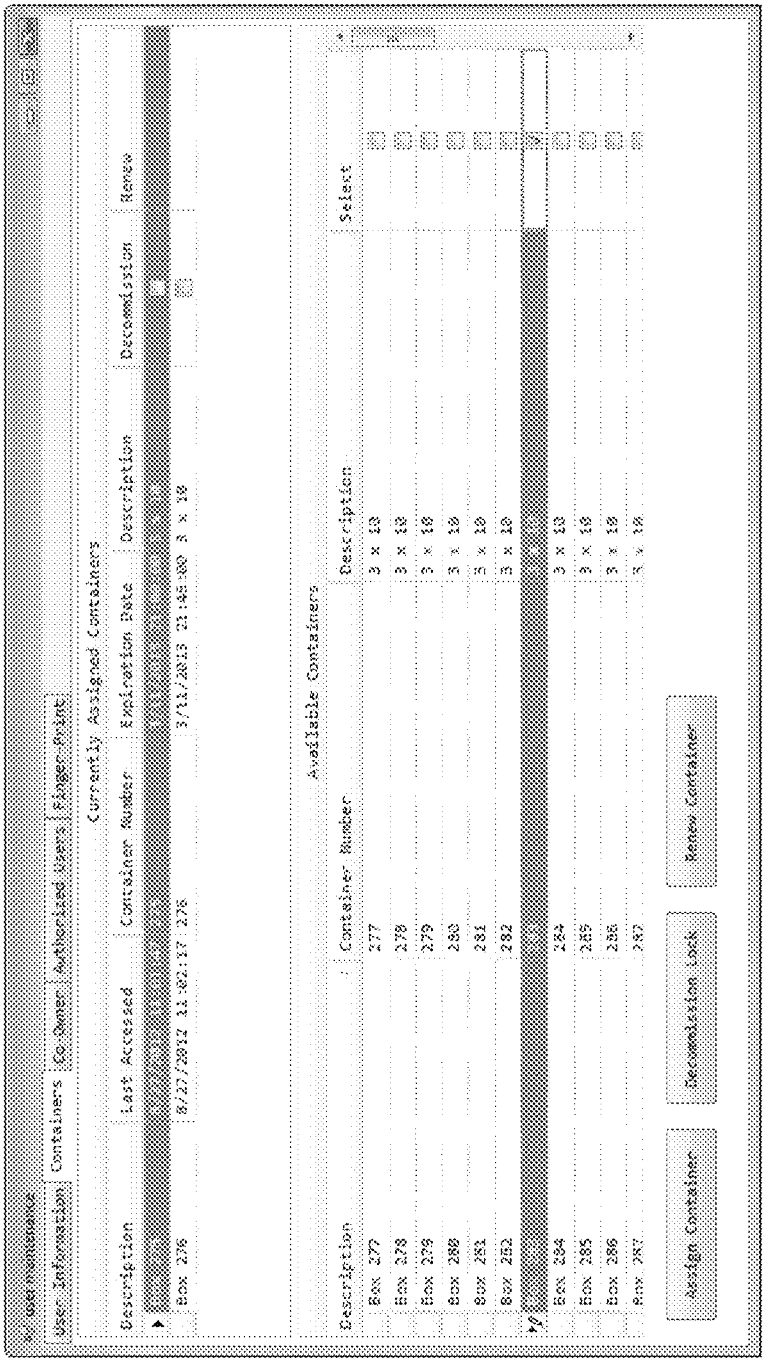

Two grids are displayed: Currently Assigned Containers and Available Containers. To assign an available container to the customer, click "Select" within the appropriate row. As shown in SCREEN SHOT Q, FIG. 26, "Container 283" will be added to the customer's profile.

Click on the "Assign Container" button—fingerprint verification must be made again by the customer. Afterwards, renewal terms must be defined. After the information is saved, Container 283's mode is set to Awaiting Commission. The customer must proceed to the kiosk, retrieve a key, and access the container.

Example 12

Updating Existing Fingerprint(s)

Customers may update their fingerprint templates at any time.

From the main menu click on the "Edit Customer" button. Next, the customer must be identified by clicking on the "Retrieve User" button. After identification has been made, click the Fingerprint tab.

To remove an existing fingerprint, click on the highlighted finger. To add a fingerprint, click on any finger and follow the standard enrollment process. Please refer to the Fingerprint Enrollment section for details.

Figure 27:
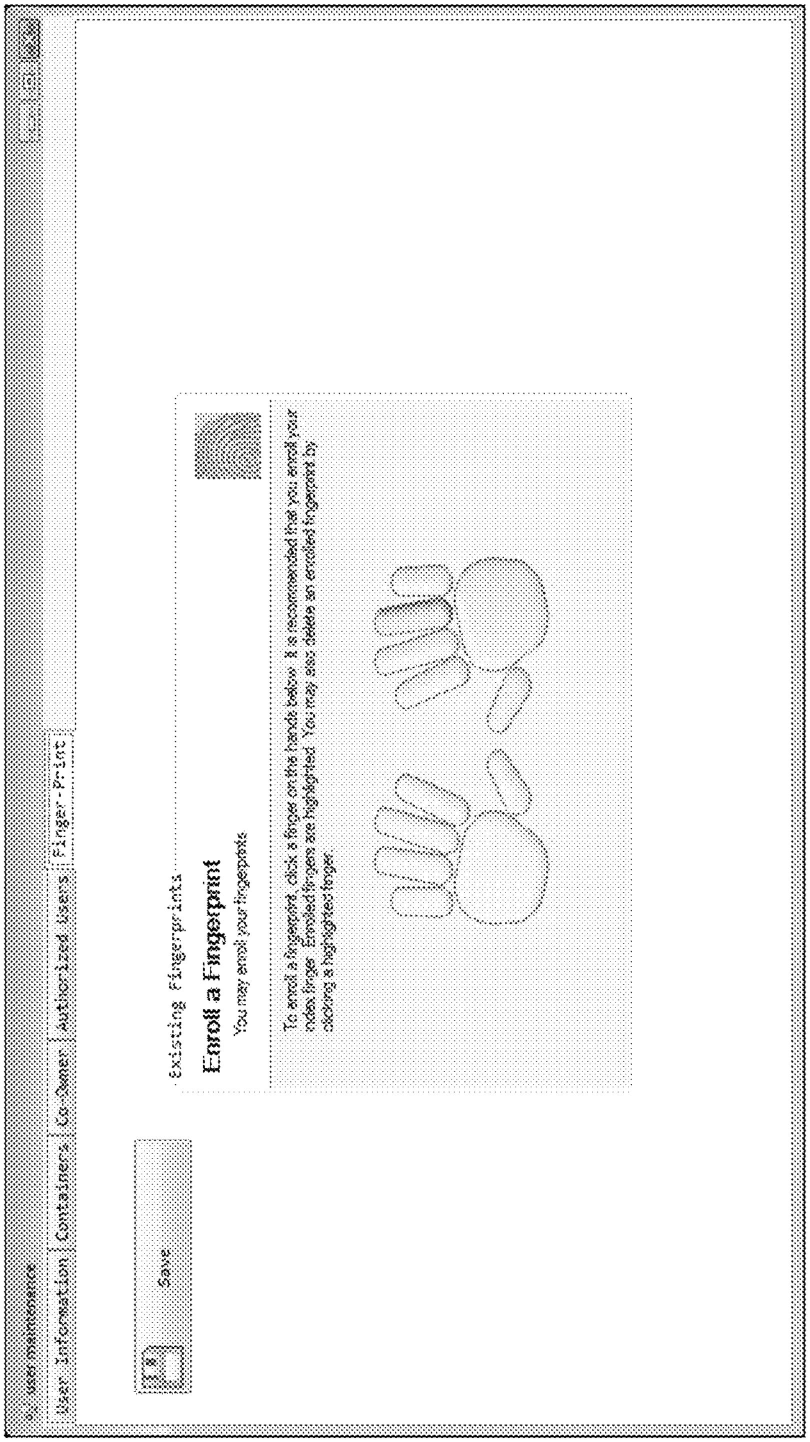

Once completed, click the "Save" button. See SCREEN SHOT R, FIG. 27.

Example 13

Adding a New Employee

Figure 28:
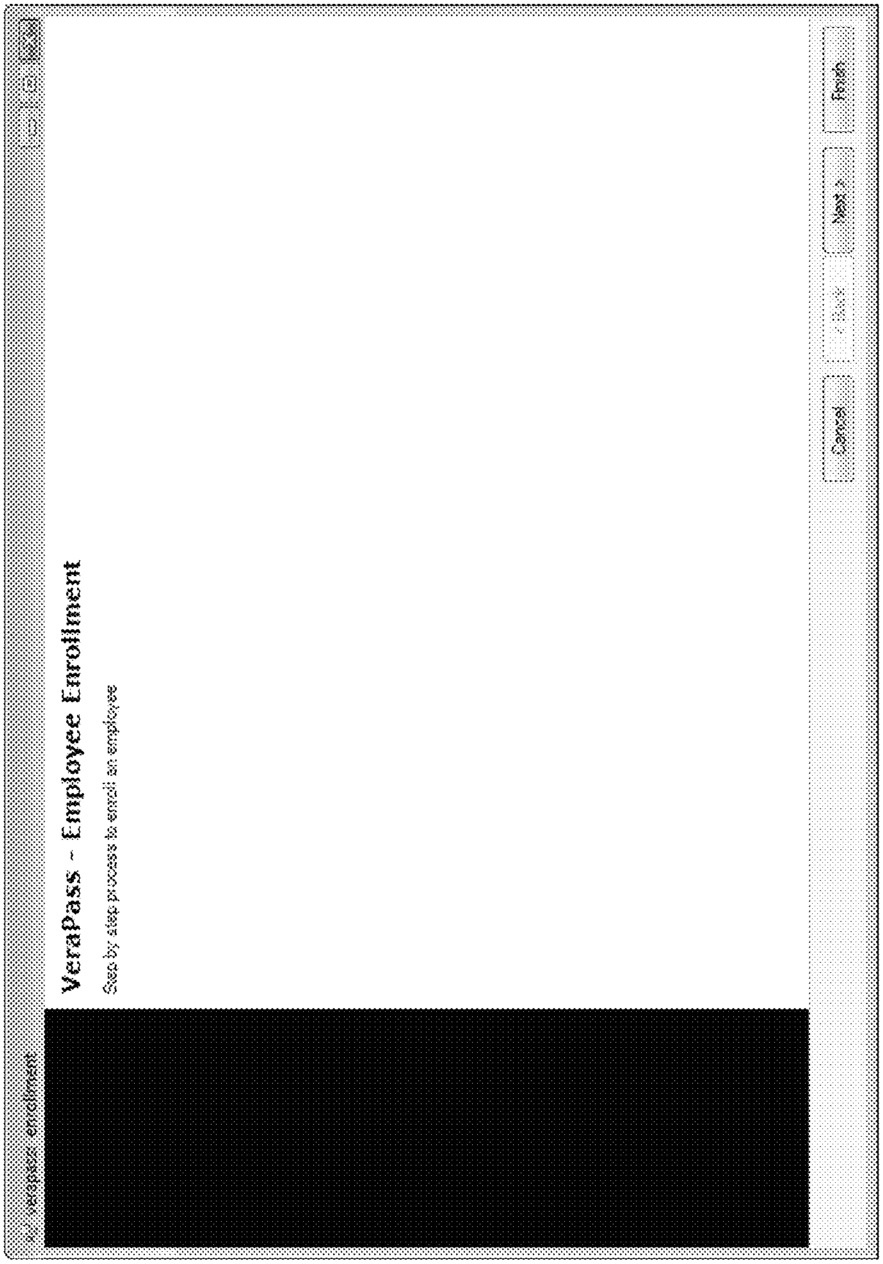

After clicking the button on the main menu labeled New Employee, the employee enrollment wizard is displayed. Click the "Next" button to proceed with the enrollment process. See SCREEN SHOT S, FIG. 28.

Figure 29:
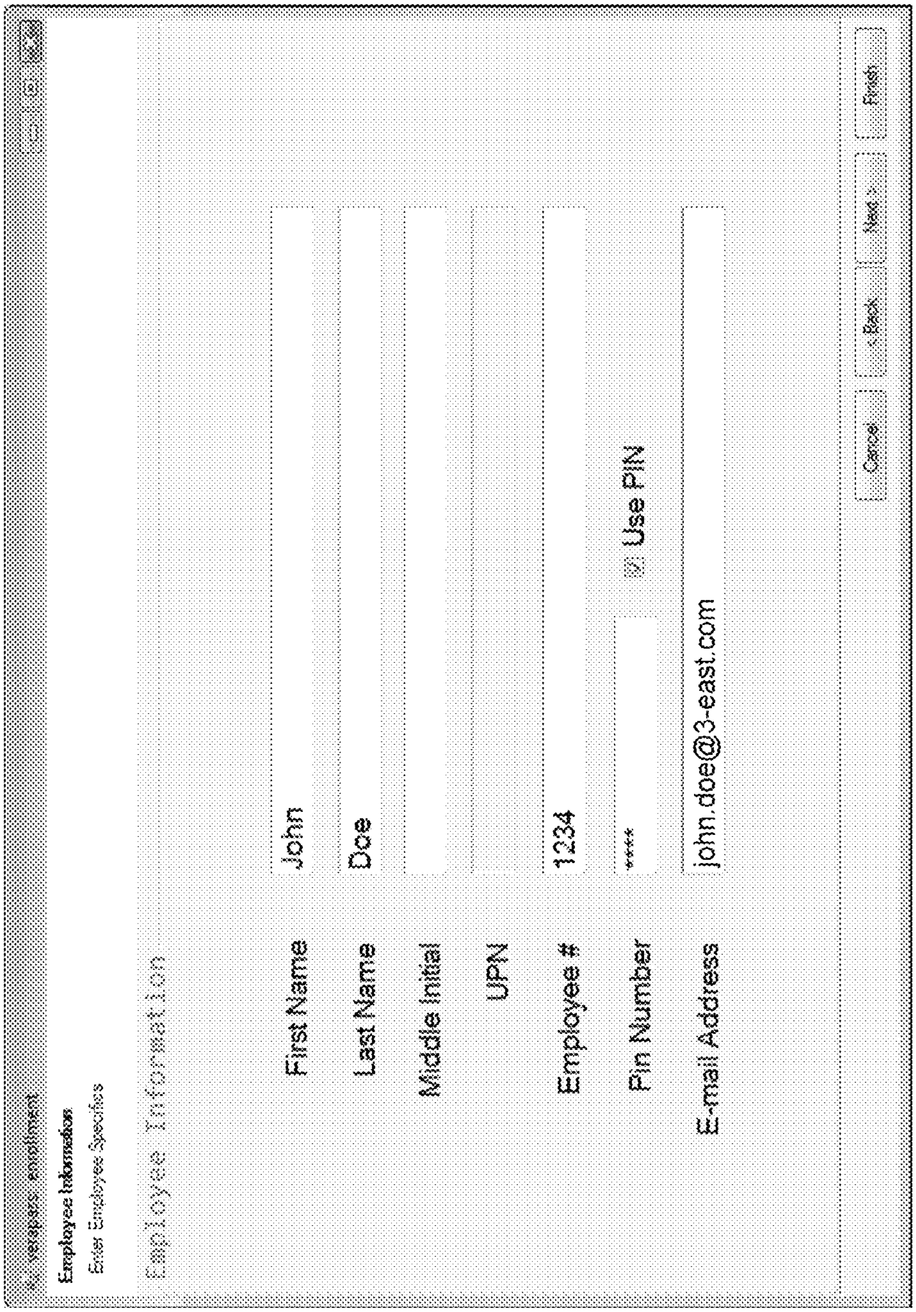

The following fields are available. See SCREEN SHOT T, FIG. 29.

Name: First, Middle Initial, Last
Universal Principal Name (UPN)
For Active Directory Integration
This field is read only
Employee Number
Pin Number
If a pin is desired, ensure "Use Pin" is checked
E-mail Address Middle initial, employee number, email address, PIN number are all optional fields.

Figure 30:

The following permissions may also be designated when adding a new employee (see SCREEN SHOT U, FIG. 30):

Administrator
Select this if an employee is to be an administrator within the VeraPass Management Software
Kiosk Access
Select this if an employee is to perform maintenance functionality at the kiosk
Add Employees
Determines the ability to add new employees
Edit Employees
Determines the ability to maintain existing employees
Temp Worker
Flags the employee as a temporary employee
Expires On
If the employee is a temporary employee, this is the date that the employee's access is to expire on.
Key Duration (Minutes)
The number of minutes the key will operate before having to be reprogrammed. Not applicable in safe-deposit container mode.

To enroll a new employee's fingerprint, click on the appropriate finger to enroll. You may enroll up to ten (10)

fingers. Typical employees should have at least two (2) fingers enrolled. If the new employee is going to be granted Administrator permission, it is strongly recommended that all ten fingers be enrolled. See SCREEN SHOT D, FIG. 13.

Once the appropriate finger is selected, it must be presented four (4) times. If the fingerprint is read correctly, the appropriate number is highlighted in blue (see SCREEN SHOT E, FIG. 14). Otherwise, a failure notice appears and the finger must be presented again. After successfully presenting the finger four times, the successful dialog feedback is displayed. Click on additional fingers as needed.

Figure 31:
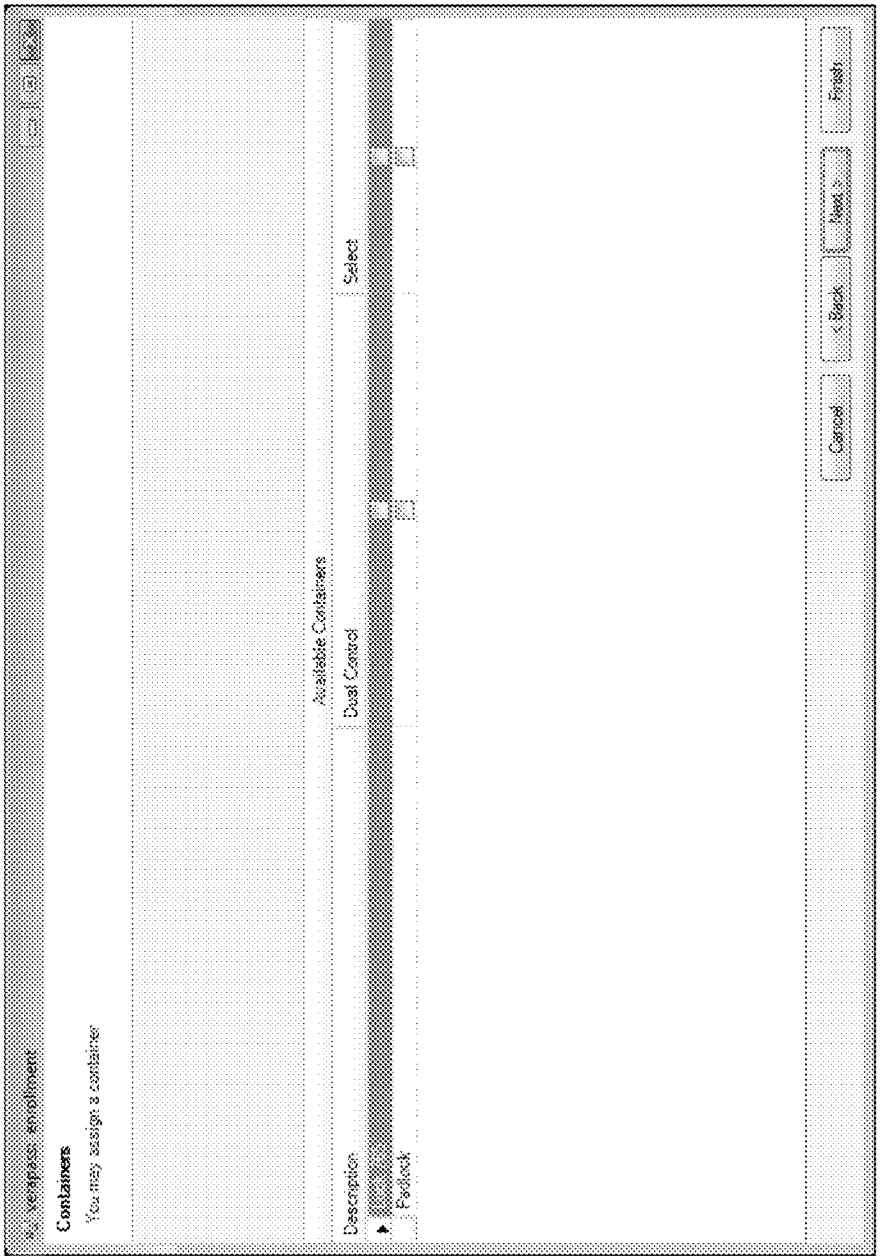

To assign containers to the employee, place a checkmark in the Select column within the container listing (see SCREEN SHOT V, FIG. 31). Containers do not have to be assigned at this time. To complete the enrollment process, click on "Next" and then the "Finish" button on the following screen (see SCREEN SHOT G, FIG. 16).

Example 14

Edit Existing Employee

Figure 32:
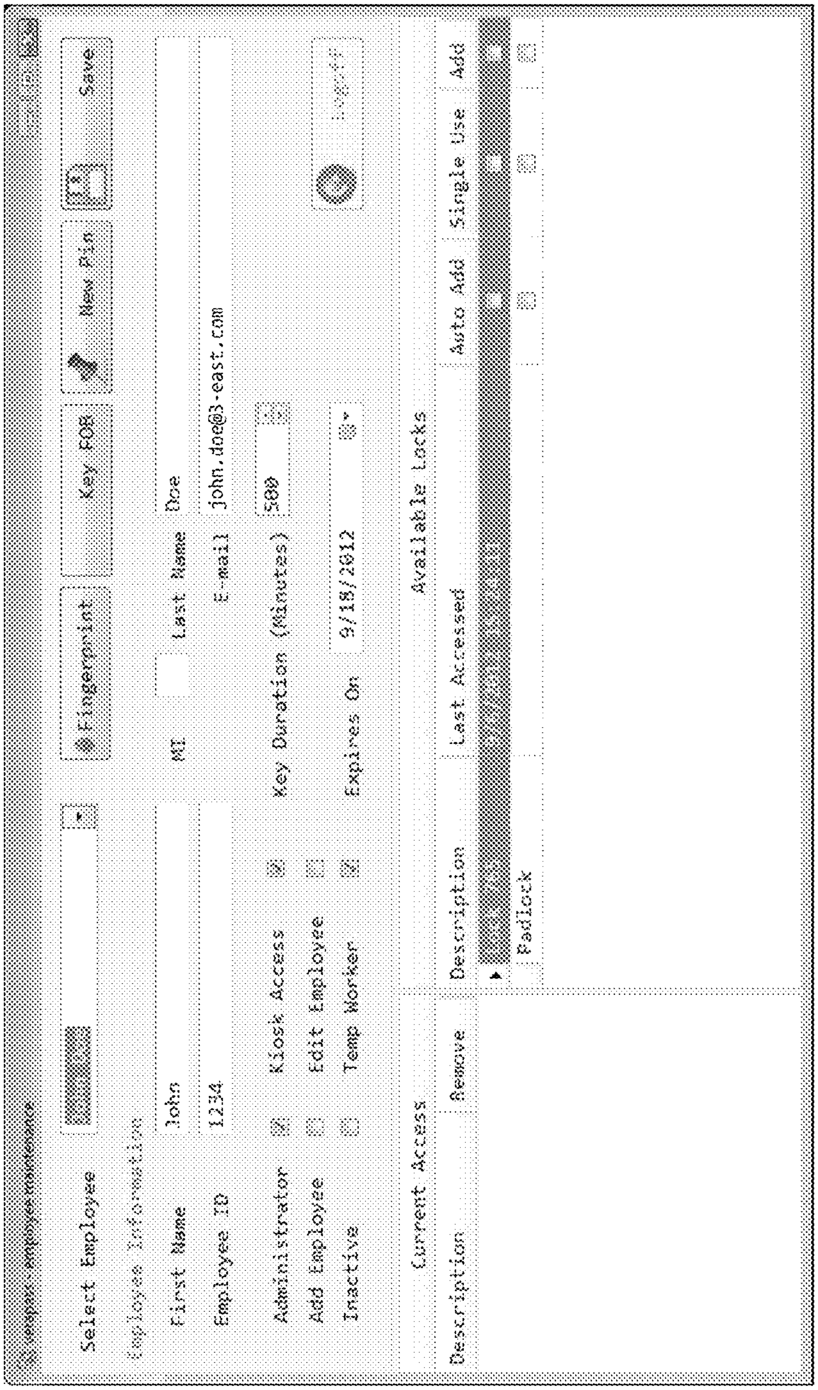

To edit an existing employee, select a name from the drop-down list. Afterwards, the appropriate fields are populated. In SCREEN SHOT W, FIG. 32, John Doe is loaded who is flagged as an administrator with kiosk access. He is a temporary employee due to expire on Sep. 18, 2012. His key duration is 500 minutes. He currently does not have access to any containers as the Current Access grid is blank.

Example 15

Configuration Area

Time Sync

The VeraPass kiosk requires a time sync server to ensure the date and time are accurate.

Five (5) public time sync servers are defined within the database; however, depending on local firewall rules, use of public time servers may not be allowed. Therefore, adding the institution's time sync server is allowed. From the configuration menu, select the Time Sync tab.

To activate an existing inactive server, double click on the appropriate row and change the desired fields below in the Details area. Click the "Save" button.

Figure 33:

To insert a new time sync server, provide the host name (or IP address), port number (123 is standard), and a comment. Click the "Save" button. The next time the watchdog service tries to perform a time sync, the newly added server will be used. Ensure only one (1) time sync server is active in the system. See SCREEN SHOT X, FIG. 33.

Example 16

Configuration Area

Update Kiosk Software

Before starting the update process, you must have a security token issued by your installing supplier before starting the update process.

To remotely update the kiosk software, click the "Configuration" button from the main menu. On the Configuration page, select the Kiosk tab.

First, click on the "Stop Watchdog" button. Second, click on the "Stop Kiosk App" button. At this point, the kiosk is no longer running the application and will not accept fingerprint data from customers or employees.

Figure 34:
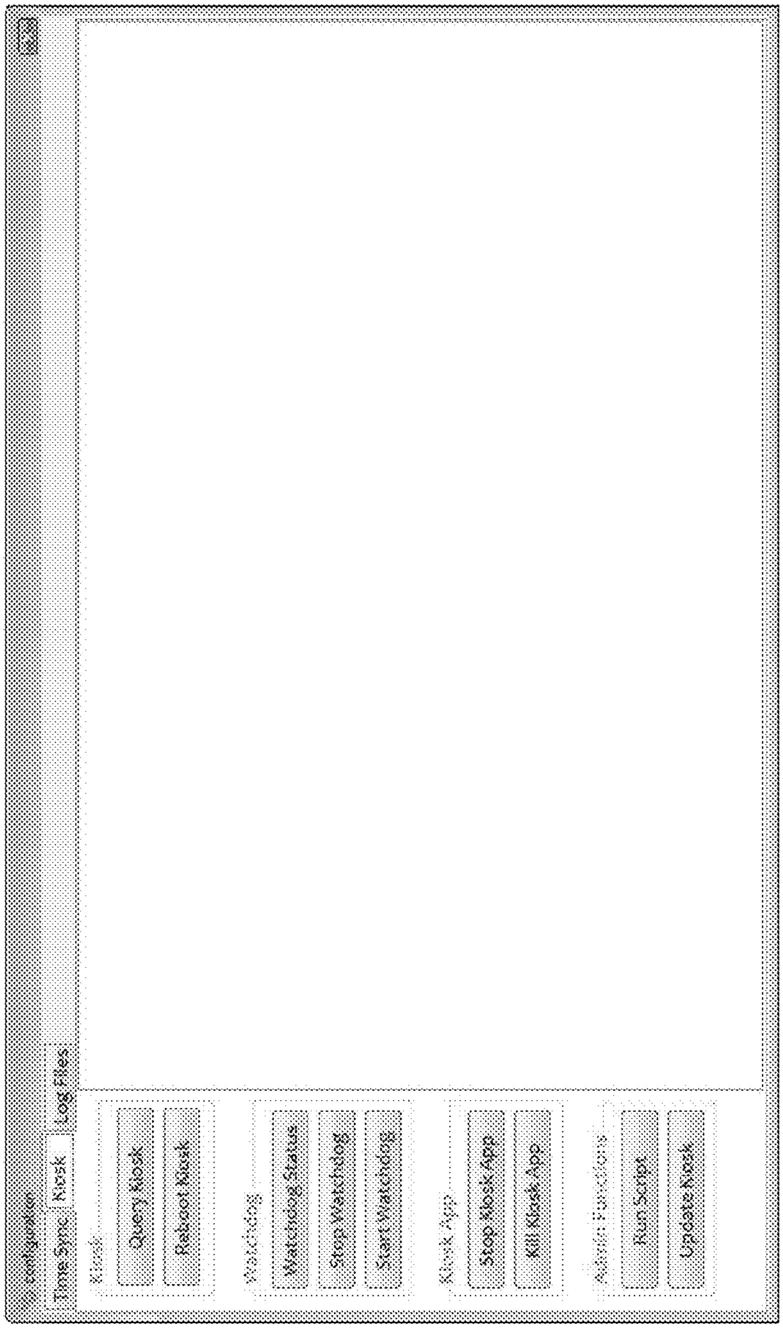

To begin the update process, click the "Update Kiosk" button. You'll be prompted to supply the security token and navigate to the new VeraPass application. Once the application has been updated, click the "Reboot Kiosk" button. The kiosk will reboot and automatically launch the new version of software. See SCREEN SHOT Y, FIG. 34.

Example 17

Configuration Area

Update Database

Before starting the database update process, you must have valid database scripts issued by your installing supplier.

From time to time, updates to the database are necessary as the application evolves. As such, changes to tables and/or stored procedures are required.

Click on the "Run Script" button. The application prompts you for the location of the script files to be executed. Once the script has been executed, results are displayed. Once all scripts have been executed, it is recommended to restart the kiosk. You should refer to the section Restarting the Kiosk for detailed instructions. See SCREEN SHOT Y, FIG. 34.

Example 18

Configuration Area

Restarting the Kiosk

To begin the restart process, click the "Configuration" button from the main menu. On the Configuration page, select the Kiosk tab.

First, click on the "Stop Watchdog" button. Second, click on the "Stop Kiosk App" button. At this point, the kiosk is no longer running the application and will not accept fingerprint data from customers or employees.

The next step is to click on the "Reboot Kiosk" button.

Figure 35:
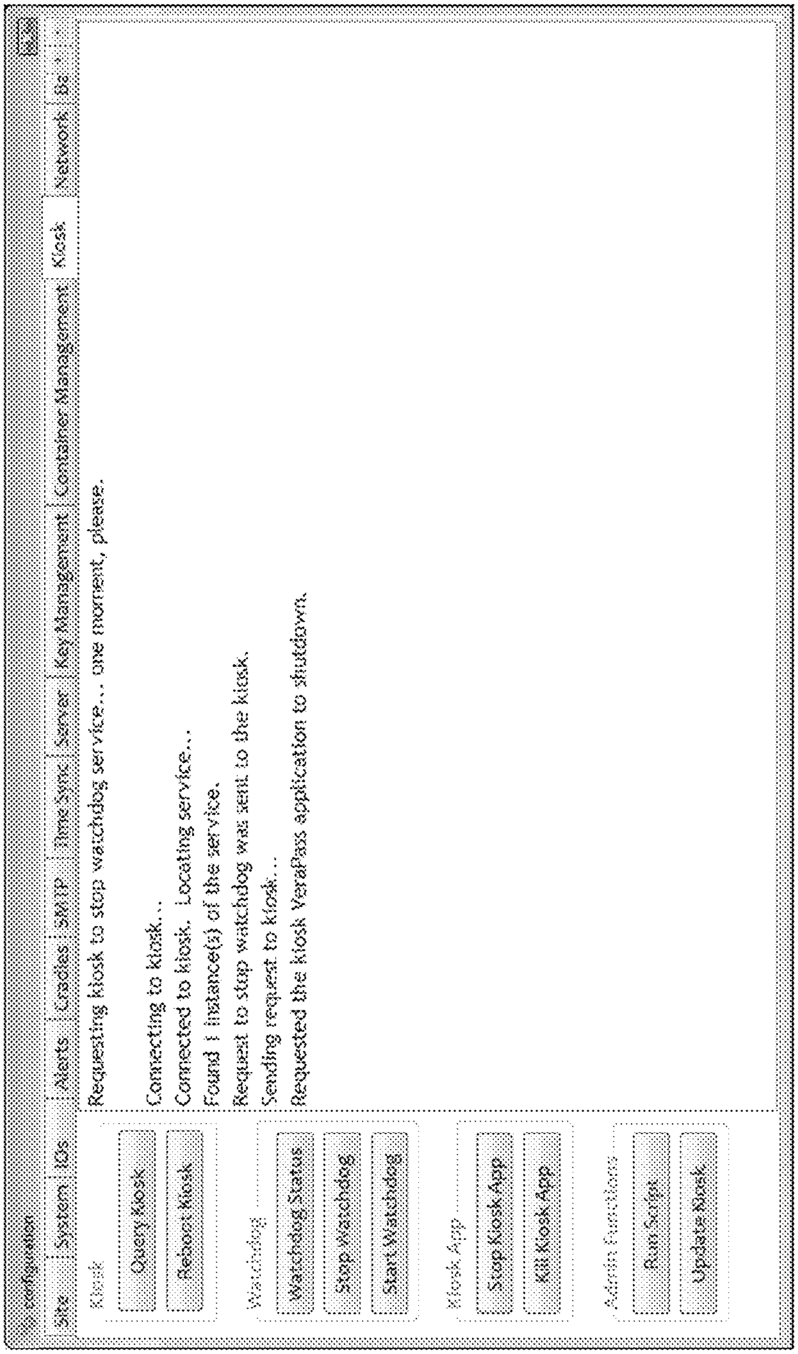

Once the request to restart the kiosk is accepted, the management software will automatically close. The kiosk automatically starts the VeraPass application upon a successful reboot. See SCREEN SHOT Z, FIG. 35.

Example 19

Configuration Area

General Kiosk Commands

Figure 36:
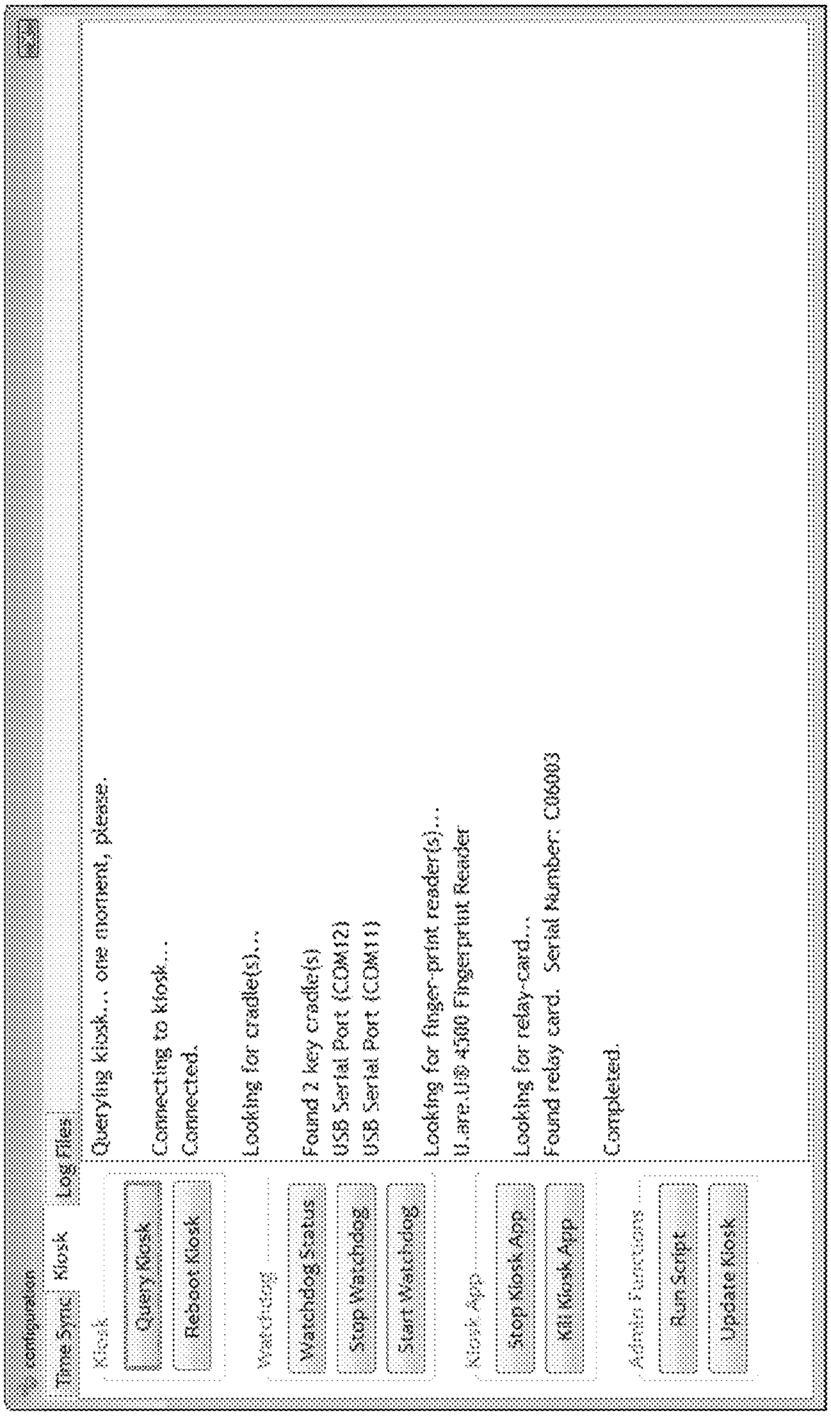

Various troubleshooting items are available within the Kiosk tab. See SCREEN SHOT AA, FIG. 36.

Query Kiosk

The kiosk searches for installed components

- Relay card
- Serial Ports
- Fingerprint Reader
- Relay Card

Provides feedback for devices found

Watchdog Status

Provides feedback as to whether or not the watchdog service is running

Stop/Start Watchdog
Stops or starts the watchdog service
Kill Kiosk App
Only use this command if the "Stop Kiosk App" fails to stop the application.
Run Script, Update Kiosk, Reboot Kiosk
Please refer to the appropriate section outlining the use of each command Example 20

Configuration Area

Kiosk Log Files

For troubleshooting needs, the log files contain diagnostic data and general feedback from the kiosk application. The log files do not contain sensitive data—neither customer data nor encryption data are displayed.

Within the "Configuration" form, clicking on the Log Files tab brings the area into view. Next, click the "Retrieve Available Logs" button to retrieve the log files from the kiosk.

Figure 37:
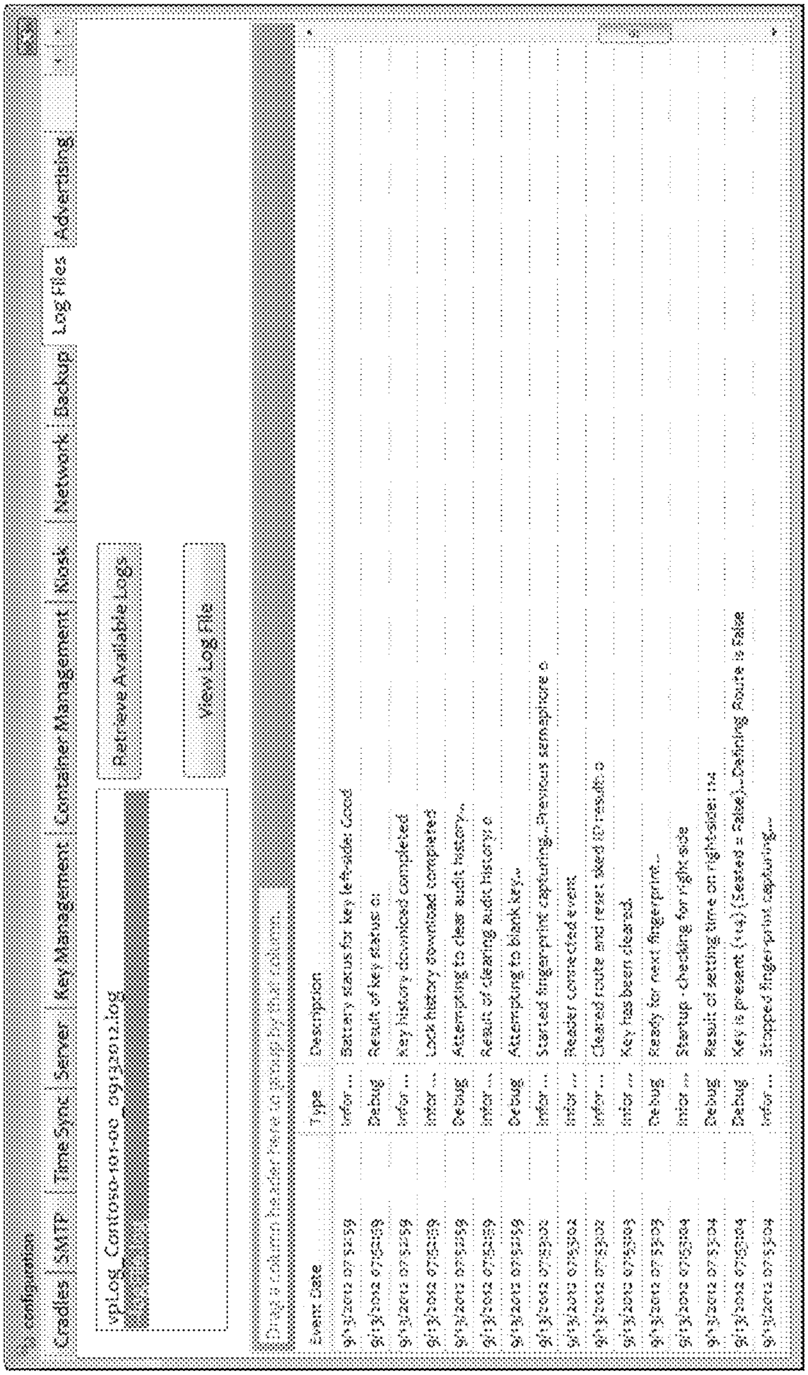

After the log file names are displayed, highlight the appropriate log to view and click the "View Log File" button. The current log file begins with a tilde character "~." See SCREEN SHOT AB, FIG. 37.

Example 21

Configuration Area

Kiosk Advertising

The advertising pictures displayed on the kiosk may be updated at any time. From within the "Configuration" form, click on the Advertising tab to display the picture controls.

Click on "Retrieve Images" to download the titles currently on the kiosk. To view the image, highlight the file and click the "Preview Image" button. The preview is located on the right hand side.

To add a picture, click "Upload Image" and select a valid JPEG file from your workstation. At present time, only JPEG photos are supported.

Figure 38:
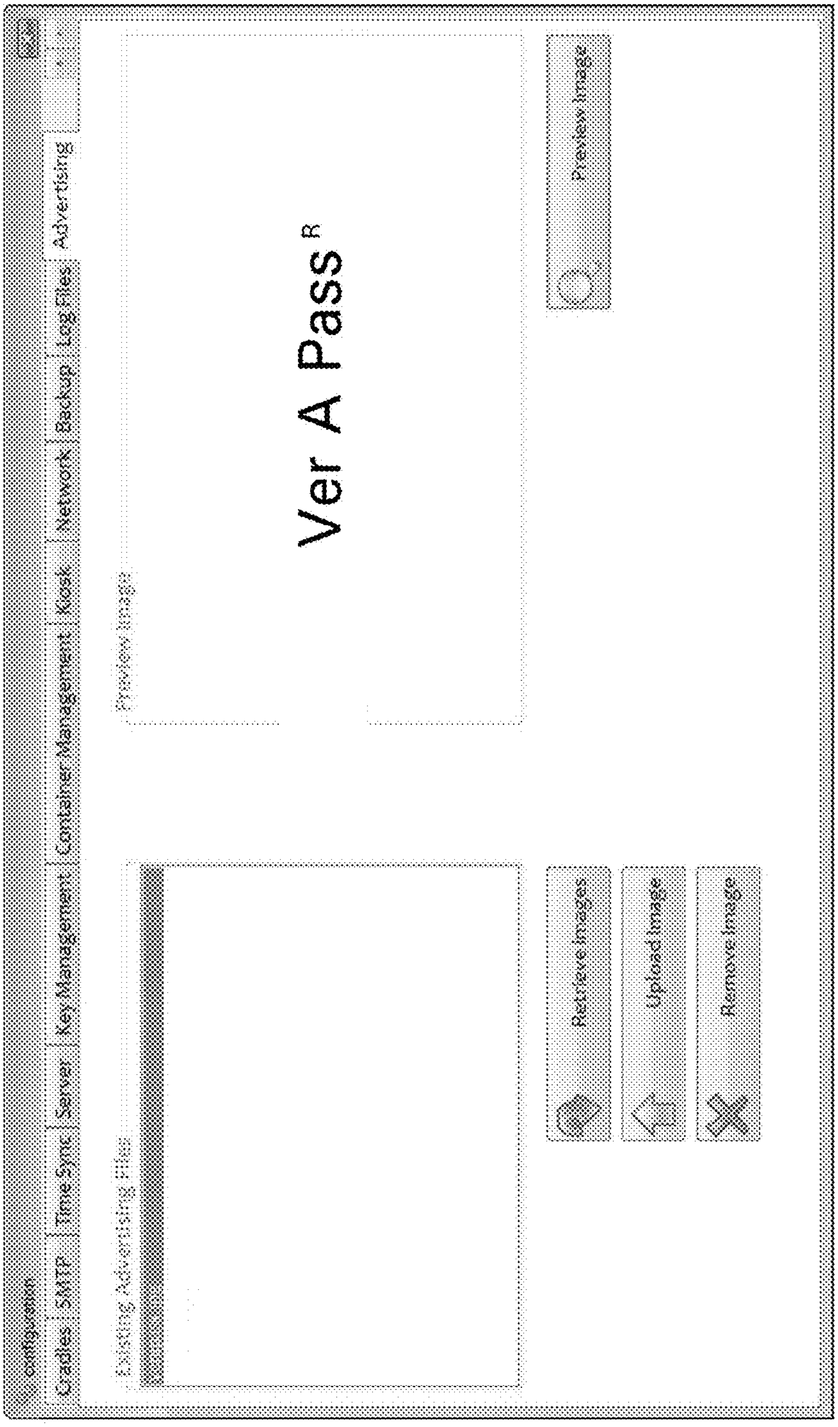

To remove a picture, highlight the name and click the "Remove Image" button. See SCREEN SHOT AC, FIG. 38.

Example 22

Kiosk Functionality

Administrative Functions

Figure 39:
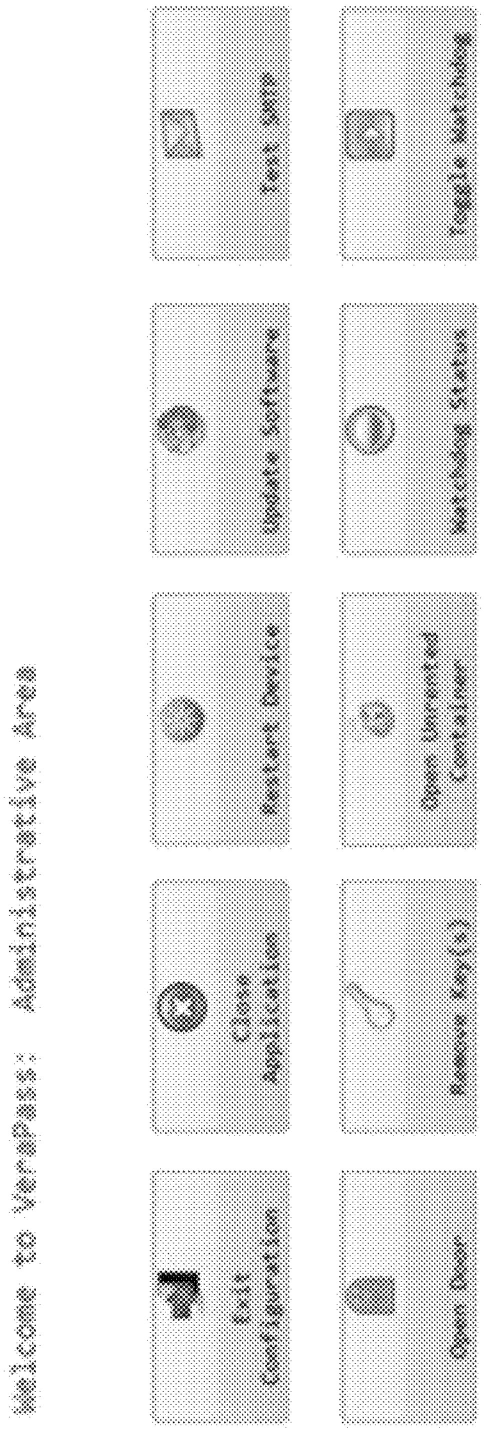

The kiosk's administrative functions are:
Exit Configuration
Places kiosk back into service
Close Application
Closes VeraPass application
Restart Device
Restarts the kiosk
Update Software
Provides ability to update software. Recommended procedure is to follow the "Update Kiosk Software" within the EMS software.
Test SMTP
Sends a test message via SMTP for diagnostic purposes
Open Door
Only available within the SDB mode
Opens the day-gate into the SDB area
Remove Key
Unlocks the key retention unit, KRU
Open Unrented Container
Only available within the SDB mode
Watchdog Status
Provides feedback on the status of the watchdog service
Toggle Watchdog
If the watchdog service is stopped, it starts it. If the service is started, a request to stop the service is sent.
See SCREEN SHOT AD. FIG. 39

Example 23

Miscellaneous Items

Key Management

Adding a key to the VeraPass system requires the key and encryption data from the installing supplier.

Only administrators can add and deactivate keys from the system.

Add New Key
Provide Key Serial Number, SN
ESID
Encryption data from supplier
Short Description of key
Click "Add" once the information is provided
If the supplier provides the encryption data within an external file, the file may be imported by selecting the "Import" button.

Figure 40:
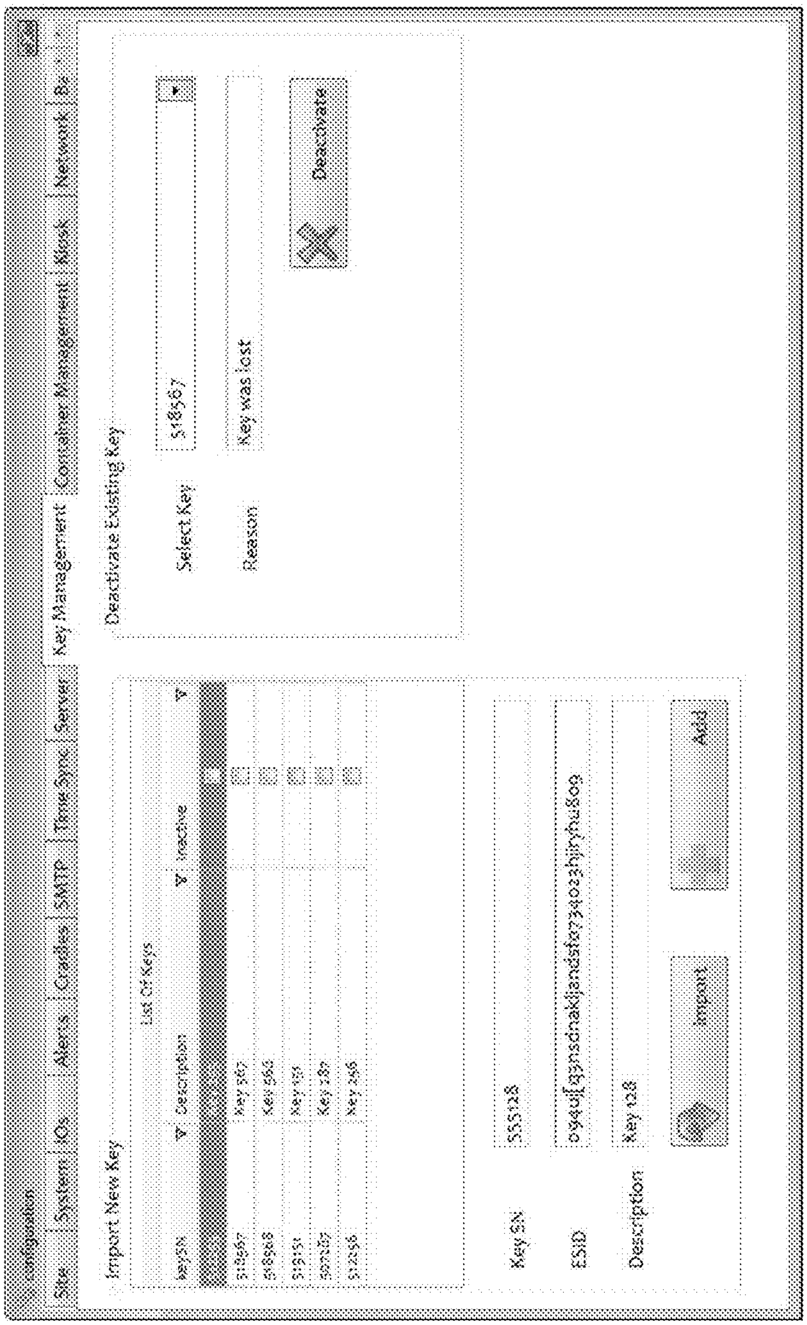

Deactivating a Key
Select a key from the drop-down list on the left-hand side
Provide a reason for the deactivation
Click on the "Deactivate" button. This process is not reversible. See SCREEN SHOT AE, FIG. 40.

While the system, method and apparatus of the invention have been disclosed in detail, and the preferred embodiments and best mode for practice of the invention have been similarly disclosed, the scope of exclusive rights to which the invention is entitled is defined by the claims appended hereto and by equivalents that perform substantially the same function in substantially the same way to achieve the same result.

The following is claimed:

1. A method for biometrically electronically controlling access to a container secured by an electronic lock, comprising the steps of: a) inserting an electronic key into the lock and recording an internal code needed to open the lock; b) transferring the internal code for that lock into a data processing machine; c) maintaining the internal code together with an identifying code for the lock of interest in the data processing machine; d) electronically biometrically identifying a potential user seeking to access a container secured by the lock; e) electronically comparing the identified potential user to a previously generated list of biometrically identified users authorized to have access to the secured container to determine whether the identified potential user is authorized to have access; f) providing the internal code to a user identified as authorized to access materials secured by the lock by encoding the internal code into an electronic key usable by the identified authorized user;

wherein recording the internal code is performed within the electronic key.

2. The method of claim 1 wherein the step of electronically biometrically identifying a potential user is performed by electronically sensing a fingerprint of the potential user.

3. The method of claim 2 wherein the step of electronically biometrically identifying a potential user is performed by electronically sensing the fingerprint of any finger.

4. The method of claim 1 wherein the step of electronically biometrically identifying a potential user is performed by electronically sensing the characteristic of an eye of the potential user.

5. The method of claim 1 wherein the step of electronically biometrically identifying a potential user is performed by sensing the DNA of the potential user.

* * * * *